(12) United States Patent
Poole et al.

(10) Patent No.: US 10,245,615 B2
(45) Date of Patent: Apr. 2, 2019

(54) SURFACE TREATMENT

(75) Inventors: Andrew James Poole, Torquay (AU); Rocky De Nys, Mysterton (AU); Peter King, Ashwood (AU); Stefan Gulizia, Werribee (AU); Mahnaz Jahedi, Toorak (AU)

(73) Assignees: COMMONWEALTH SCIENTIFIC AND INDUSTRIAL RESEARCH ORGANISATION, Campbell, Australian Capital Territory (AU); JAMES COOK UNIVERSITY, Townsville, Queensland (AU)

(*) Notice: Subject to any disclaimer, the term of this patent is extended or adjusted under 35 U.S.C. 154(b) by 81 days.

(21) Appl. No.: 13/810,110

(22) PCT Filed: Jul. 15, 2011

(86) PCT No.: PCT/AU2011/000901
§ 371 (c)(1),
(2), (4) Date: May 23, 2013

(87) PCT Pub. No.: WO2012/006687
PCT Pub. Date: Jan. 19, 2012

(65) Prior Publication Data
US 2013/0236696 A1    Sep. 12, 2013

(30) Foreign Application Priority Data
Jul. 15, 2010    (AU) ............................... 2010-903154

(51) Int. Cl.
*B32B 27/04*    (2006.01)
*B32B 15/08*    (2006.01)
(Continued)

(52) U.S. Cl.
CPC ................ *B05D 1/12* (2013.01); *B32B 15/08* (2013.01); *B32B 15/20* (2013.01); *B32B 27/04* (2013.01);
(Continued)

(58) Field of Classification Search
CPC ............................. B08B 17/06; B08B 17/065
See application file for complete search history.

(56) References Cited

U.S. PATENT DOCUMENTS

| 4,171,410 A * | 10/1979 | Frob | ........................ C08J 9/40 264/321 |
| 4,603,653 A * | 8/1986 | Bews | ........................... 116/209 |

(Continued)

FOREIGN PATENT DOCUMENTS

| JP | 2001-288398 A | 10/2001 |
| JP | 2005305765 A * | 11/2005 |
| JP | 2009202129 A * | 9/2009 |
| WO | WO 2003/056064 A1 | 7/2003 |
| WO | WO 03056064 A1 * | 7/2003 |
| WO | WO 2007/033936 A1 | 3/2007 |

(Continued)

OTHER PUBLICATIONS

Bixler et al., Biofouling: lessons from nature, Phil. Trans. R. Soc. A., vol. 370, 2012, p. 2381.*

(Continued)

*Primary Examiner* — Z. Jim Yang
(74) *Attorney, Agent, or Firm* — Nixon & Vanderhye P.C.

(57) ABSTRACT

A method of protecting a polymer surface against fouling, which method comprises embedding in the polymer surface particles having antifouling properties, wherein the particles are embedded in the polymer surface by a spray mechanism in which the particles are accelerated and sprayed onto the polymer surface with a suitable velocity such that the particles become embedded in the polymer surface, wherein the particles are embedded in the polymer surface without an adhesive or binder and wherein the particles do not form a continuous layer on the polymer surface.

18 Claims, 7 Drawing Sheets

(51) Int. Cl.
  *B05D 1/12* (2006.01)
  *B32B 15/20* (2006.01)
  *C23C 24/04* (2006.01)
  *C23C 4/08* (2016.01)
  *C09D 5/16* (2006.01)
  *C08J 7/06* (2006.01)
  *C09D 7/40* (2018.01)
  *C08K 3/08* (2006.01)
  *C08K 5/00* (2006.01)
  *C08K 3/015* (2018.01)

(52) U.S. Cl.
  CPC .............. *C08J 7/06* (2013.01); *C09D 5/1618* (2013.01); *C09D 7/69* (2018.01); *C23C 4/08* (2013.01); *C23C 24/04* (2013.01); *C08K 3/015* (2018.01); *C08K 5/0058* (2013.01); *C08K 2003/085* (2013.01); *C08K 2003/0893* (2013.01); *Y10T 428/24413* (2015.01); *Y10T 428/249954* (2015.04); *Y10T 428/249976* (2015.04)

(56) References Cited

U.S. PATENT DOCUMENTS

| | | | |
|---|---|---|---|
| 4,751,113 A | 6/1988 | Riccio et al. | |
| 4,940,623 A * | 7/1990 | Bosna | C23C 4/02 427/275 |
| 5,226,380 A | 7/1993 | Fischer | |
| 5,284,682 A | 2/1994 | Martin | |
| 5,302,414 A * | 4/1994 | Alkhimov | B05B 7/144 427/191 |
| 5,354,603 A * | 10/1994 | Errede | B63B 59/04 422/6 |
| 6,139,913 A * | 10/2000 | Van Steenkiste | B05B 7/1486 427/189 |
| 6,194,079 B1 * | 2/2001 | Hekal | B01J 20/02 206/204 |
| 6,283,386 B1 * | 9/2001 | Van Steenkiste | B05B 7/1486 118/308 |
| 6,306,491 B1 * | 10/2001 | Kram | B01D 69/00 424/422 |
| 6,486,231 B1 * | 11/2002 | Hekal | B01J 20/28014 521/905 |
| 6,528,154 B1 * | 3/2003 | Yamato | A45D 34/04 206/823 |
| 7,426,765 B2 | 9/2008 | Helmsderfer | 5/655 |
| 2002/0110682 A1 * | 8/2002 | Brogan | B29C 70/64 428/325 |
| 2003/0099853 A1 * | 5/2003 | Takayama | C22C 9/02 428/553 |
| 2003/0180024 A1 * | 9/2003 | Edlinger | B01D 21/0012 385/132 |
| 2003/0190414 A1 * | 10/2003 | Van Steenkiste | B05B 7/1486 427/201 |
| 2003/0190415 A1 * | 10/2003 | Van Steenkiste | B05B 7/1486 427/201 |
| 2003/0190444 A1 * | 10/2003 | Stoppelmann | B32B 27/20 428/36.91 |
| 2004/0067385 A1 * | 4/2004 | LeClaire | C23C 4/02 428/612 |
| 2004/0137201 A1 * | 7/2004 | Hannan | B23K 9/0256 428/172 |
| 2005/0103457 A1 | 5/2005 | Nun et al. | |
| 2006/0068087 A1 * | 3/2006 | Gambino | H05K 3/102 427/123 |
| 2006/0156948 A1 * | 7/2006 | Hendriks | A01N 25/34 106/15.05 |
| 2006/0235143 A1 * | 10/2006 | Muller | B08B 17/06 524/588 |
| 2007/0003631 A1 * | 1/2007 | Sayre | B01J 13/10 424/490 |
| 2007/0125702 A1 * | 6/2007 | Ramaswamy | B01D 67/0062 210/490 |
| 2007/0141305 A1 * | 6/2007 | Kasai | B05D 5/08 428/143 |
| 2007/0156249 A1 * | 7/2007 | Lawrynowicz | A61L 27/306 623/23.51 |
| 2007/0207335 A1 * | 9/2007 | Karandikar | C09D 7/67 428/560 |
| 2007/0209584 A1 * | 9/2007 | Kalynushkin | C23C 4/12 118/311 |
| 2007/0237706 A1 * | 10/2007 | Black | B82Y 30/00 423/447.3 |
| 2007/0264451 A1 * | 11/2007 | Yusa | C23C 18/1621 428/34.1 |
| 2008/0160259 A1 * | 7/2008 | Nielson | A61F 2/91 428/148 |
| 2008/0219944 A1 | 9/2008 | Longo et al. | |
| 2008/0305305 A1 * | 12/2008 | Sano | B29C 33/424 428/168 |
| 2009/0214772 A1 | 8/2009 | Ahn et al. | |
| 2010/0068467 A1 * | 3/2010 | Song | H05K 3/1208 428/172 |
| 2010/0119707 A1 * | 5/2010 | Raybould | C23C 24/04 427/185 |
| 2010/0314162 A1 * | 12/2010 | Gardner | B29C 67/202 174/258 |
| 2011/0030578 A1 * | 2/2011 | Schulz | C09C 1/3063 106/15.05 |
| 2011/0039024 A1 * | 2/2011 | Jabado | C23C 24/04 427/201 |
| 2011/0039066 A1 * | 2/2011 | Bauer et al. | 428/141 |
| 2011/0143094 A1 * | 6/2011 | Kitada | B32B 33/00 428/143 |
| 2011/0174207 A1 * | 7/2011 | Harrick | C09D 5/1618 114/244 |
| 2011/0177320 A1 * | 7/2011 | Mehrabi | B29C 67/202 428/304.4 |
| 2011/0186513 A1 * | 8/2011 | Vuong | B01D 61/04 210/636 |
| 2011/0206817 A1 * | 8/2011 | Arnold | A23L 3/3454 426/335 |
| 2011/0217544 A1 * | 9/2011 | Young | B29C 37/0032 428/327 |
| 2012/0052251 A1 * | 3/2012 | Heller et al. | 428/172 |
| 2012/0176860 A1 * | 7/2012 | Stenzel | A01N 59/16 367/20 |
| 2013/0039153 A1 * | 2/2013 | Hartshorne | B63B 59/04 367/153 |
| 2013/0078450 A1 * | 3/2013 | Jensen | B22F 3/115 428/327 |
| 2013/0129976 A1 * | 5/2013 | Hertter | C23C 24/04 428/141 |
| 2013/0142950 A1 * | 6/2013 | Arndt | C23C 24/04 427/192 |
| 2013/0209389 A1 * | 8/2013 | Tofte Jespersen | B01J 13/0069 424/78.09 |
| 2013/0251948 A1 * | 9/2013 | Lyons | B32B 5/16 428/148 |
| 2014/0241937 A1 * | 8/2014 | Hofener | C23C 4/04 420/469 |

FOREIGN PATENT DOCUMENTS

| | | | | |
|---|---|---|---|---|
| WO | 2008/086402 | | 7/2008 | |
| WO | WO 2009152481 A1 * | 12/2009 | | B29C 67/202 |
| WO | WO 2010/022353 A1 * | 2/2010 | | |
| WO | WO 2010022353 A1 * | 2/2010 | | B29C 37/0032 |
| WO | WO 2010127981 A1 * | 11/2010 | | |

OTHER PUBLICATIONS

NPL on Polylactic Acid from UL Prospector, obtained from https://plastics.ulprospector.com/generics/34/c/t/polylactic-acid-pla-properties-processing on Jan. 2, 2017.*

(56) References Cited

OTHER PUBLICATIONS

Materials Data Book from Cambridge University Engineering Department (Year: 2003).*

Machine translation of JP 2005/305765 A, obtained from J-platpat service of the JPO on May 14, 2018.*

International Search Report, dated Sep. 20, 2011 in connection with PCT International Application No. PCT/AU2011/006901, filed Jul. 15, 2011.

Written Opinion of the International Searching Authority, dated Sep. 20, 2011 in connection with PCT International Application No. PCT/AU2011/000901, filed Jul. 15, 2011.

International Preliminary Report on Patentability (Chapter I of the Patent Cooperation Treaty), including Written Opinion of the International Searching Authority, dated Jan. 15, 2013 in connection with PCT International Application No. PCT/AU2011/000901, filed Jul 15, 2011.

Kartilikeyan, Jeganathan, "Cold Spray Technology", Advanced Materials & Processes, Mar. 2005, p. 33-35.

Extended European Search Report, EP Appln. No. 11806155.5, dated Oct. 10, 2017.

MJ Vucko, PC King, AJ Poole, Y Hu, MZ Jahedi, R de Nys (2014) Assessing the antifouling properties of cold-spray metal embedment using loading density gradients of metal particles. *Biofouling* 30 (6):651-666.

PC King, AJ Poole, S Horne, R de Nys, S Gulizia, MZ Jahedi (2013) Embedment of Copper Particles into Polymers by Cold Spray. *Surface & Coatings Technology* 216:60-67.

MJ Vucko, PC King, AJ Poole, MZ Jahedi, R de Nys (2013) Polyurethane seismic streamer skins: an application of cold spray metal embedment. *Biofouling* 29(1):1-9.

MJ Vucko, PC King, AJ Poole, C Carl, M Jahedi, R de Nys (2012) Cold spray metal embedment: a novel antifouling technology. *Biofouling* 28(3):239-248.

* cited by examiner

SURFACE TREATMENT

CROSS-REFERENCE TO RELATED APPLICATIONS

This application is a § 371 national stage of PCT International Application No. PCT/AU2011/000901, filed Jul. 15, 2011, claiming priority of Australian Patent Application No. 2010903154, filed Jul. 15, 2010, the contents of each of which are hereby incorporated by reference in their entirety.

FIELD OF THE INVENTION

The present invention relates to the protection of surfaces against fouling in aqueous environments, such as marine environments. The present invention also relates to a polymer surface that has been modified in accordance with the present invention to have antifouling properties. The present invention also provides a polymer composite having antifouling functionality.

BACKGROUND OF THE INVENTION

In the context of the present invention, fouling refers to the deposition or accumulation of unwanted material on a solid surface, most often in an aquatic environment. Fouling can involve living organisms (referred to as "biofouling") or non-living substances that are inorganic or organic in nature. The solid surface is intended to perform some function and fouling can impede or interfere with that function. Fouling may also give rise to environmental or health issues. For these reasons, fouling is preferably reduced or avoided all together.

In particular, biofouling is a highly diverse problem which affects all manner of submerged, man-made surfaces. Biofouling tends to occur in all aqueous environments, but is particularly prevalent in marine environments. Marine biofouling has enormous economic impact on shipping, offshore oil and gas rigs, power and desalination plants and aquaculture.

Historically, one of the earliest preventive measures taken against marine biofouling was the sheathing (or cladding) of wooden vessels with copper and copper alloys. Copper and its alloys are particularly effective in providing protection against the majority of biofouling organisms. However, with the advent of iron-hulled ships, galvanic corrosion between copper and iron became an issue.

Biocide-loaded paint films became the standard practice for protection of ship hulls, and have continued to be so to this day. During the 20$^{th}$ century, paint formulations became reliant on highly toxic biocides, most notably tributyltin (TBT). However, the use of TBT in antifouling paints on ships has now been prohibited by the International Maritime Organization (IMO) due to concerns about the ecological consequences of its widespread use. In any case, a disadvantage of relying on paint systems is the need to periodically recoat. Furthermore, outage for recoating can have significant cost implications for commercial vessels.

On the other hand, the use of copper and copper alloy sheathing has been demonstrated to exhibit long term antifouling activity, and continues to be used in certain applications, such as pipe work and the legs of oil and gas platforms. Copper-nickel alloys are often preferred over pure copper because they are more resistant to erosion. Other metals such as zinc are also known to provide biofouling protection, although the effect is generally more short-lived than for copper. However, the sheathing/cladding approach is not without problems. Typically, the metal/metal alloy is applied in the form of tiles and problems can arise when it comes to bonding tiles to a hull surface, especially in relation to more complex-shaped surfaces. In this case, the tiles may also need to be specially tailored.

This problem may be overcome by the kind of approach taught in U.S. Pat. No. 4,751,113. This patent describes a method of applying an antifouling coating to a marine surface which involves grit blasting the surface, coating with an adhesion and seal layer and depositing a continuous layer of metal or metal alloy by thermal spraying high velocity molten or semi-molten metal particles. However, this approach is somewhat involved and, as will be apparent, thermal spraying is not applicable to all materials used in marine service.

In U.S. Pat. No. 5,284,682 a coating is applied to the hull of a boat using a two part epoxy-based thermosetting adhesive coating. Copper or copper alloy particles are incorporated into the adhesive by premixing the particles into an epoxy prepolymer or polyamide hardener liquid component prior to application to the hull. Once applied the adhesive coating is cured at ambient temperature. Oblong particles have been found to beneficially concentrate near the surface of the coating, resulting in a freely corroding outer layer and the formation of a beneficial green oxide layer that prevents marine fouling.

In WO94/08840 marine organism growth is inhibited by applying an organic irritant in particulate form to an adhesive layer provided on a substrate surface, the adhesive being in its uncured state (i.e. wet). Copper granules or a copper wire screen may also be applied to the adhesive layer. The organic irritant migrates to the surface of the layer to provide protection against biofouling, possibly in cooperation with the copper if used.

A problem with the aforementioned techniques is that the coating typically relied upon is rigid and suffers from delamination, particularly when the coating is applied to a flexible structure. In addition to delamination, temperature variations and cycling can contribute to a weakening of chemical bonds which secure the active particles within the coating. As most of these techniques involve the active particles being consumed by migration through the coating and/or through attrition of the coating, there is also a need to regularly re-apply and cure fresh coating. This can be a time consuming and cumbersome task.

The use of high temperature thermal spraying to provide a continuous metal coating is often impractical due to the propensity of polymers to erode under the prolonged application of heat that is required to develop such a coating—most polymers have relatively low melting points and this limits the temperatures that can be effectively applied during thermal spraying. Large differences in thermal expansion coefficient between a metal coating and the polymer substrate can also lead to delamination if heat is applied during spraying.

Protection of polymer and polymer-based materials against marine biofouling is a complex problem which current coating methods, including the above, fail to adequately address. Marine equipment made from polymers is often designed and required to be flexible. For example seismic streamers are long cables housed in a polymer sheath, sometimes over 10 kilometers in length, that in use are towed behind a vessel for geophysical exploration.

The streamers contain sensors and electronics to detect acoustic pulses reflected off geologic structures below the ocean floor. The build-up of biomass due to macrofouling of the streamers can be a significant problem since this will increase drag and affect measurements. However, in this context, prevention of marine fouling is problematic for the following reasons.

Adhesion of an antifouling paint to the polymer sheath is generally not practical due to the size and form of the streamer. Typical antifouling paints are also generally not flexible enough to remain adhered to the polymer sheath.

Attaching a cladding layer of copper or other non-polymeric material onto a polymer substrate is limited by large mismatches in physical properties, particularly elastic modulus and strain to fracture. Cladding would restrict the range of motion that may be required of a flexible polymer.

Against this background, there is a need to provide a method of providing antifouling properties to a polymer surface that does not suffer the drawbacks associated with conventional techniques as described. The invention is believed to have particular utility in reducing or avoiding biofouling, more particularly marine biofouling, of a polymer surface.

SUMMARY OF THE INVENTION

Accordingly, the present invention provides a method of protecting a polymer surface against fouling, which method comprises embedding in the polymer surface particles having antifouling properties, wherein the particles are embedded in the polymer surface by a spray mechanism in which the particles are accelerated and sprayed onto the polymer surface with a suitable velocity such that the particles become embedded in the polymer surface, wherein the particles are embedded in the polymer surface without an adhesive or binder and wherein the particles do not form a continuous layer on the polymer surface.

Herein the term antifouling refers to a property whereby the build up of inorganic and/or organic species on a surface is reduced or avoided all together. Reducing or preventing the accumulation of such species on a surface may be advantageous for a variety of reasons, such as efficiency and/or hygiene/health. The species in question may be such things as organic or inorganic compounds that manifest themselves as scale or corrosive deposits.

The present invention is believed to have particular utility in reducing or preventing biofouling, that is the accumulation of unwanted biological organisms on a surface as a result of the surface being exposed to some form of aqueous environment, including fresh, salt water or water that has condensed on a surface. Examples of biofouling include the formation of biofilms and algae, and the accumulation and proliferation of microorganisms, such as the bacterium *Legionella* that is responsible for Legionnaires' disease. Biofouling may also be due to "macrofouling" species, such as barnacles, mussels, seaweed and the like.

The present invention also provides a polymer surface comprising embedded particles having antifouling properties, when prepared in accordance with the method of the invention.

The present invention further provides a polymer composite having antifouling properties, the polymer composite comprising particles having antifouling properties embedded in a polymer surface, wherein the particles do not form a continuous layer on the polymer surface, and wherein a portion of the particles are embedded below the surface of the polymer and in direct communication with the surface of the polymer.

The present invention further provides a polymer composite having antifouling properties, the polymer composite comprising particles having antifouling properties embedded in a polymer surface, wherein the particles do not form a continuous layer on the polymer surface, and wherein the particles are embedded in craters or cavities in the polymer that are formed by impact of particles on the polymer surface.

When compared with conventional approaches such as that described in U.S. Pat. No. 5,284,682, it will be clear that the various embodiments of the present invention are fundamentally different with respect to the structural arrangement of particles in the polymer and the mechanism by which the particles are bound to the polymer. This is because the present invention does not involve the use of an adhesive or binder for attachment of antifouling particles to the surface.

The method of the present invention seeks to overcome the deficiencies of conventional techniques by functionalising polymeric substrates to provide antifouling properties by embedding suitably active particles in the polymer. When embedded the particles tend to be less prone to attrition and erosion, especially when the polymer substrate is mechanically robust and resilient. Furthermore, if the antifouling functionality of the surface diminishes, it can be readily rejuvenated by spraying of additional particles onto the polymeric substrate in accordance with the methodology of the invention. It is also beneficial that the antifouling properties can be achieved, and where necessary restored, without the need to prepare a structure with an adhesive or binder layer. It is also advantageous that the particles may be embedded in the polymer without damage to the polymer surface and with suitably high loading to achieve the desired functionality. As will be explained below, it is possible that embedding of particles in the polymer will result in changes to the polymer properties, depending amongst other things on the depth to which the particles are embedded in the polymer. Such changes can be tolerated provided that they do not result in key characteristics of the polymer being changed to an extent that the polymer becomes unsuitable for its intended use.

In a preferred embodiment, the method of the present invention is implemented as part of a retrofitting operation in which a polymer substrate that has previously been functionalised to provide antifouling properties or otherwise used (i.e. not freshly prepared) is sprayed with particles in accordance with the invention to provide antifouling properties. This retrofitting operation has the advantage of functionalising the surface without the need to apply one or more functional coatings prior to the application of the particles, such as an adhesive or binder coating.

The particles may provide antifouling functionality to the polymer surface in which they are embedded through a chemical release mechanism. A chemical release mechanism for the purposes of the present invention includes decomposition of the particles, reaction of the particles with one or more reagents and/or release of one or more chemicals from the particles. In this embodiment, as the efficacy of the particles is due to a chemical release mechanism, the particles may be functionally effective without needing to contact directly species that are responsible for fouling. This means that the particles retain functionality even when the particles are embedded in the polymer such that no surface of the particles is present at, or protrudes above, the surface of the polymer. In this case however it is important that the particles are in open communication with the surface of the polymer so that in use antifouling components that are released from the particles will contact the environment by migration of the components to the polymer surface and/or by ingress of the environment. It is advantageous that the particles retain functionality when embedded beneath the surface of the polymer since the particles are then protected from surface conditions that may be erosive in nature.

In accordance with the invention the particles are embedded in a polymer surface with a distribution density that is effective to provide antifouling properties. The particles may be present as individual entities and/or as aggregates/clusters of individual particles. Importantly however, in accordance with the present invention it has been found possible to achieve effective antifouling properties without needing to provide a continuous surface layer of active material on the substrate. This has a number of advantages as follows:

- Avoiding the need to form a continuous antifouling layer avoids delamination issues otherwise encountered with cladding/sheath technology.
- The effective life of the functionalised surface may be increased because the active particles are embedded in a surface and thus protected from attrition or erosion from the surface layer.
- The effective life of the functionalised surface may be increased by controlling the distribution, availability and position of the active particles.
- Continuous layers can restrict the range of movement of the underlying substrate. This problem is avoided using the present approach.
- The use of particles of suitably active material is likely to be less expensive than providing a continuous layer due to the reduced volume of active material required to protect the same surface area.
- The particles are typically embedded in the polymer surface by spraying. This allows rapid application and thus high throughput, and also ready application to surfaces with complex shapes/profiles.
- Combinations of particle and polymer substrate may be selected without concern for normal continuous coating requirements with respect to particle/substrate adhesion and particle/particle cohesion.

The underlying principles of the present invention may be applied to functionalise a polymer surface with properties other than anti-fouling properties. Thus, in another embodiment, the present invention provides a polymer composite having a functionalised surface property, the polymer composite comprising particles having a functional property embedded in a polymer surface, wherein the particles do not form a continuous layer on the polymer surface, and wherein a portion of the particles are embedded below the surface of the polymer and in direct communication with the surface of the polymer.

In another embodiment the present invention provides a polymer composite having a functionalised surface property, the polymer composite comprising particles having a functional property embedded in a polymer surface, wherein the particles do not form a continuous layer on the polymer surface, and wherein the particles are embedded in craters or cavities in the polymer that are formed by impact of particles on the polymer surface.

In these various embodiments the polymer composite typically has an elastic modulus of no more than 3000 MPa, for example no more than 2000 MPa.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

BRIEF DESCRIPTION OF THE DRAWINGS

The present invention is illustrated with reference to the accompanying non-limiting drawing in which.

DETAILED DISCUSSION OF THE INVENTION

Figure 1:
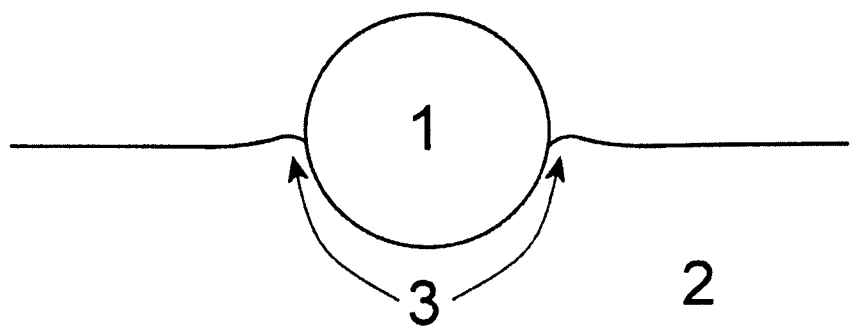
FIGS. 1-3 are schematic diagrams illustrating an embodiment of the present invention. These figures show a particle having antifouling functionality embedded in a polymer surface to varying degrees.

The present invention provides a method for preventing the accumulation of fouling species on the surface of polymers that may occur when these materials are used and exposed to a potentially fouling environment. The invention may have particular utility in preventing biofouling, such as marine biofouling, that may result when a polymer surface is exposed to a marine environment.

The invention achieves antifouling by embedding in a polymer surface particles having antifouling efficacy. The particles are embedded in the polymer surface by penetrating into the polymer surface. It is an advantage that no adhesives or binders are used or required to maintain the position of the particles in the polymer.

To be effective in providing antifouling functionality at least some particles must be embedded in the polymer surface such that in use they will contact, or come into contact with, the environment. Particles may protrude from the polymer surface and/or be embedded below the surface of the polymer. In the latter case, to be effective the particles should be in direct (open) fluid communication with the polymer surface by virtue of an open-ended channel created in the polymer due to the particle becoming embedded in it.

The distribution density of particles (or clusters of particles) over the polymer surface may vary depending upon, amongst other things, the propensity of fouling species. e.g. marine organisms, to otherwise contact or attach to the polymer (the nature of the environment to which the polymer surface is exposed will be relevant here) and the extent/longevity of antifouling protection required. An adequate and optimum distribution density can be determined by experiment or trial and error. In this regard protection against antifouling may be measured relative to a corresponding polymer surface that has not been modified in accordance with the present invention.

The particles used in the present invention are functionally active with respect to preventing fouling. The particles may be inorganic and/or organic particles, such as those known in the art to possess antifouling properties. By way of example, with respect to marine antifouling, particles of copper and compounds and alloys thereof (e.g. copper-nickel alloys), zinc and alloys and compounds thereof are preferred. In one embodiment, bronze, a copper tin alloy, is used as the chemical release of copper within this alloy is relatively low thereby extending the effective life of surfaces impregnated with these particles. However, any material with antifouling properties can be used provided that it is available in powder form, can be made into a powder form or can be atomized by the spray gun, and does not thermally degrade during the spray process.

Other types of particle that may be used to prevent or reduce biofouling include particles, of peptides, chitosan, silver, $TiO_2$ and ZnO. These have been shown to be particularly effective against microbial fouling.

Other suitably active particles include photocatalysts and chemicals (preferably organic chemicals) immobilized within a solid matrix, which function as a controlled release particles.

In a preferred embodiment, the method may be implemented with two or more active components either within the same particle (e.g. the particle may be formed of at least two active components such as a copper- and zinc-based alloy) or as a mixture of separate particles.

Generally, the only restriction on the powder particle size is that it must be in a range that allows the particles to be accelerated to high enough velocity to achieve embedding in the chosen polymer. For example, an optimal particle size range for cold spray is 1-100 μm, although the upper limit for the particle size may be up to 200 μm or above. However, this figure is provided solely to illustrate the common practice, and is not meant to be limiting. An appropriate particle size range highly depends on the process, powder material and polymer. For example, for certain antifouling applications it may be considered advantageous to spray particles less than 1 μm, including nanoparticles. Here, a nanoparticle is defined as a particle of dimension less than 100 nm. In this context, nanoparticles of peptides, chitosan, silver, $TiO_2$ and ZnO have been shown to be particularly effective against microbial fouling, since they interact with cells through a variety of mechanisms. Unless otherwise indicated, average particle size relates to the mean maximum diameter of a population of particles of at least 20, when measured using a scanning electron micrograph.

The concentration of particles embedded in the polymeric substrate should be such that the particles do not unduly affect the requisite properties that the polymer should possess based on its intended use. For example, the elastic modulus of the polymer substrate should be substantially unaffected. Some change in polymer properties may be tolerated depending upon context of use. Generally, however, relevant properties of the polymer will be changed by no more than 50%, preferably no more than 30% and even more preferably no more than 10%, by incorporation of particles in the polymer.

The concentration of particles used in accordance with the present invention is at least that required to impart the requisite functional properties to the polymeric substrate, taking into account the deposition profile of the particles on and within the substrate. Typically, based on the surface area of the substrate, the concentration of particles will be at least 5 $g/m^2$, more preferably at least 10 $g/m^2$ and even more preferably at least 50 $g/m^2$. Typically, the surface concentration of particles is no more than 300 $g/m^2$, for example no more than 200 $g/m^2$. Higher surface concentrations may begin to adversely affect the bulk characteristics of the polymer.

The polymer may be a component in its own right, i.e. a component formed from the polymer, and in this case the polymer will have been selected based on its inherent properties, such as flexibility and/or resilience. Alternatively, the polymer may be a layer provided over another substrate. In this case the layer may be an outer layer that is normally present as part of a product or product component. This layer is susceptible to being treated in accordance with the present invention to provide antifouling properties. As another alternative, a polymer layer may be applied to another substrate with the specific intention of then functionalising the polymer layer to provide antifouling properties. This may be done, for example, to impart antifouling properties to a substrate surface that is not polymeric in nature and thus not susceptible to treatment in accordance with the present invention. For example, it may be possible to apply a polymeric coating to a metal substrate and then embed particles in the polymeric coating in accordance with the present invention to achieve antifouling properties.

In accordance with the present invention particles are accelerated and sprayed onto a polymer surface with a suitable velocity such that the particles become embedded in the polymer surface. There is no need for any post-spray treatment of the surface to induce a chemical reaction, curing or setting. Indeed, as noted, the bulk properties of the polymeric substrate are preferably substantially unaltered following embedding of the particles.

The mechanism by which the particles are embedded in the polymer involves deformation of the polymer and "trapping" of particles. The kinetic energy of the particles is dissipated on collision with the polymer surface through deformation of the polymer and this enables at least a portion of the particle to penetrate the polymer surface. The polymer should have suitably elastic properties so that deformation of the polymer is partially recovered reducing the diameter of the pathway from which the particle entered the layer to less than the diameter of the particle, thereby trapping (i.e. mechanically adhering) the particle within the polymer. While not wanting to be bound by theory, it is also thought that at least part of the kinetic energy of the impacting particle is converted to heat thereby increasing the local surface temperature of the polymer and, in thermoplastic polymers, enabling easier penetration of the particle into the polymer. The elastic deformation referred to may actually be visco-plastic in nature whereby deformation of the polymer caused by impact of the particles is only partially recovered yet this is still sufficient to secure the particles within the polymer substrate.

Figure 2:
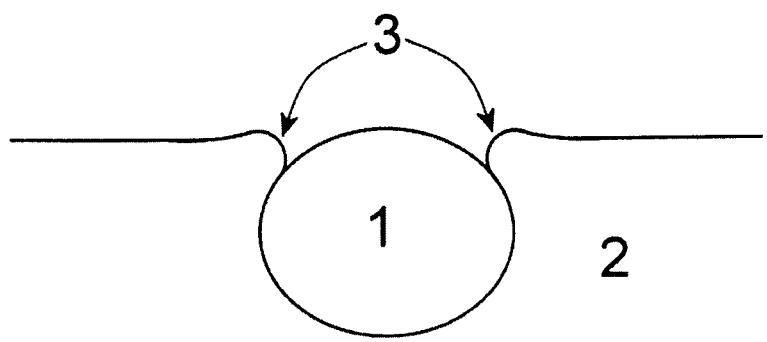
Figure 3:
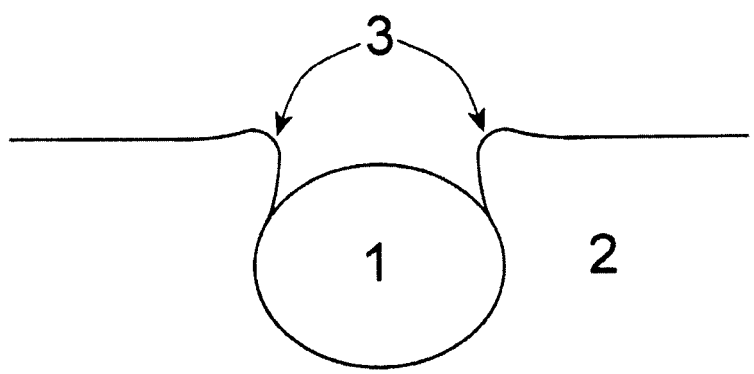

The mechanism underlying the methodology of the invention is illustrated in FIGS. 1 to 3. FIGS. 1 to 3 are schematic cross-sections, both showing an embedded particle (1) in a polymer surface (2). Initially the particle may be spherical, non-spherical or irregularly shaped. Upon impact the particle penetrates into the surface (2) causing the polymer to deform (3). In FIG. 1 the particle has penetrated deeply enough that it has become physically trapped. Encapsulation of the particle by the deformed polymer prevents the particle from rebounding off the surface. It would be somewhat of an idealisation of the process to assume that all particles will embed identically, as shown in FIG. 1. In practice the penetration depth and amount of substrate and particle deformation vary depending on the velocity and angle of impact, particle size, polymer type and particle materials. Usually, it is found that within the same particle spray stream some particles penetrate to the level of the polymeric substrate (FIG. 2) or more deeply below the surface, as shown in FIG. 3, while other particles penetrate to a lesser degree, as illustrated in FIG. 1. Nevertheless, with sufficient deformation of the polymer material around the particle it is held in place without rebounding.

Once a particle has struck the polymer surface, subsequent particles may drive it further down. Depending on the spray conditions these secondary particles may become embedded too due to the gross deformation of the surface that results from high numbers of impacts. Alternatively, the particles may only be loosely bound and prone to fall away.

Noting the underlying principles by which particles are intended to become embedded in a polymer substrate, the suitability of a given polymer for treatment in accordance with the present invention may be readily assessed and understood. In this regard it may be necessary to take into account how the prevailing conditions at which the particles are sprayed onto the polymer surface influence the characteristics of the polymer. For example, spraying may result in local heating of the polymer and this may influence relevant properties of the polymer such as elastic modulus and surface hardness. This may actually be beneficial in terms of making the polymer more susceptible to particles becoming embedded in it, provided of course that the polymer retains suitable deformation characteristics to trap the particles once embedded. However, any (irreversible) changes in the polymer characteristics should be carefully considered based on the principles of the present invention for achieving antifouling properties, and on the intended use of the polymer and thus on the properties required of it.

The polymeric substrate in which particles are to be embedded is preferably flexible with an elastic modulus of no more than 3000 MPa, for example no more than 2500 MPa measured at room temperature. The elastic modulus may be no more than 2000 MPa, no more than 1500 MPa, no more than 1000 MPa or no more than 800 MPa. For the purposes of the present invention elastic modulus is inclusive of Young's modulus and storage modulus, measured according to the method described in Example 10. The invention may be implemented with more rigid polymers however depending upon the characteristics of the particles and the impact velocity used to embed the particles if these influence relevant properties of the polymer that affect embedding of particles. Polymers having an elastic modulus of no more than 2000 MPa measured at room temperature may be preferred due to their ability to be loaded with a suitably high density of particles relative to more rigid polymers, such as polycarbonate. Other factors, such as surface hardness (as measured by the Shore hardness D2 method) may also affect the particle loading achievable for a polymer. A Shore D2 hardness of less than 75 and more preferably less than 70 is preferred to enable higher particle loadings (e.g. greater than 30 g/m$^2$).

The process of the invention may be applied to protect a variety of polymers. Typically, the polymer must have the necessary surface characteristics (mechanical properties) to allow particles to be embedded, as described. Depending on the characteristics of the polymer it may be advantageous to treat the surface so as to render if it is less resistant to penetration by the spray particles. This may, for example, be achieved by chemical means. Alternatively, the polymer may be heated during the spray procedure so as to soften it and thus improve particle penetration. Any such surface treatment should not adversely impact on the properties of the polymer.

The polymeric substrate may be a cured thermoset polymer or a thermoplastic polymer. Here the term "cured thermoset polymer" means a polymer has been cured by a chemical reaction within the bulk of the polymer. Curing may be achieved as a result of solvent evaporation, oxidative crosslinking, catalyzed/cross linked polymerization, coalescence, and the like. As such, the term is not intended to embrace the use of an extraneous adhesive or binder, even though these may have polymeric character.

The polymer used may well be dictated by the material currently being used for a particular application. Suitable polymers include rubbers, thermoplastic elastomers and/or organosilicon compounds such as silicones. The polymer may be selected from the group consisting of polyamide, epoxy, polyester, polycarbonate, polyethylene, polypropylene, polyurethane, polytetrafluoroethylene, polydimethylsiloxane, polystyrene and/or polyvinylchloride. The polymer may be a homopolymer or copolymer.

As noted, the polymer may be a component in its own right or it may be a layer. Typically, the polymer surface to be treated in accordance with this invention has a thickness of at least 10 μm, more preferably at least 50 μm, even more preferably at least 100 μm, and yet even more preferably at least 200 μm. The thicker the polymer the deeper the particles can penetrate, whilst still being in communication with the environment at the polymer surface.

The surface being treated in accordance with the invention may be entirely polymeric in nature. However, it is possible that the polymer is a composite structure. In this case, the surface will typically comprise at least 50 wt % polymer, more preferably at least 70 wt % polymer and even more preferably at least 90 wt % polymer. In general, the higher the polymer content the better particles will penetrate the polymer and be captured thereby. The polymers may include additives known in the art which modify the elastic modulus of the polymer, such as impact modifiers.

In general terms particles are embedded in a polymer surface by a spray mechanism in which the particles are accelerated to a suitable velocity, and thus have suitably high kinetic energy, such that when they contact the polymer surface they penetrate the polymer surface. In general terms, the polymer is deformed as the particles penetrate into it. The polymer then recovers or "rebounds" thereby squeezing and/or enveloping the particle and so securing it in place. Depending upon the energy of the particles a lesser or greater degree of penetration may be achieved. This process control may be advantageous as it allows the antifouling properties of a polymer surface, or regions of a polymer surface, to be tailored.

The method of the invention may be implemented using a variety of spray technologies. The particular technology used should be capable of accelerating the particles to a suitably high velocity to cause the particles to become embedded in the polymer surface. The velocity required may vary as between different polymers based on the material properties of the polymers. It is also important however that the spray technology and/or the velocity of particles used do not irreversibly and adversely affect the properties of the polymer, for example by undue heating at high temperature.

In another embodiment the particles may be embedded in the polymer using cold-gas dynamic spraying. Cold-gas dynamic spraying (or cold spraying) is a known process which involves feeding (metallic and/or non-metallic) particles into a high pressure gas flow stream which is then passed through a converging/diverging nozzle that causes the gas stream to be accelerated to supersonic velocities. The particles are then directed on to a substrate surface. The process is carried out at relatively low temperatures, below the melting point of the particles and the substrate. The process is typically used to apply a coating to a substrate by particle impingement. The fact that the process takes place at relatively low temperature allows thermodynamic, thermal and/or chemical effects on the substrate and the particles being sprayed to be reduced or avoided. This means that the original structure and properties of the particles can be preserved without phase transformations etc. that might otherwise be associated with high temperature processes such as plasma, HVOF, arc, gas-flame spraying or other thermal spraying processes. The underlying principles, apparatus and methodology of cold-gas dynamic spraying are described, for example, in U.S. Pat. No. 5,302,414. The fact that cold-gas dynamic spraying tends to minimise structural changes in the substrate means that it may be a preferred application technique for the present invention.

Cold-gas dynamic spraying is carried out at a suitable temperature that will not result in undue softening of the particles. In this regard it should be noted that to penetrate the polymer on impact the particles must be sufficiently solid/hard. Softening of the particles may impair their ability to penetrate the polymer surface when sprayed. The particles should also be functionally active following spraying and it is possible, depending upon the mechanism by which the particles provide antifouling effect, that the spraying conditions may influence this. For example, the particles may lose functionality if spraying results in significant surface oxidation of the particles. The conditions for cold-gas dynamic spraying will therefore be selected accordingly based on the particles being sprayed. The effect of spraying on the polymer surface should also be taken into account.

The two conventional uses of cold spray are (a) the build up of a coating layer above the surface of the substrate where the coating layer thickness is at least several times the average particle diameter and (b) the massive build up of a deposit, at least several millimeters thick, which can subsequently be used as a free-standing component. In order for build up of the particle material to occur, the particles must impact the substrate surface at a velocity exceeding a certain critical velocity. The critical velocity is material specific.

The current invention is believed to represent significant departure from these two conventional uses of cold spray. According to the present invention the particles are accelerated towards a polymer surface by a cold spray device such that when they contact the polymer surface they penetrate the polymer surface by deformation of the polymer. Depending upon the energy of the particles a lesser or greater degree of penetration may be achieved.

However, the particles need not be accelerated to above the critical velocity for particle/particle cohesion. If indeed a given set of spray conditions were to result in the build-up of material on the initial, embedded layers of particles, such that a continuous coating layer might form on the substrate surface, then this build-up should be avoided by reducing the number of particle impacts on any given area of substrate. This may be achieved, for example, by lowering the powder feed rate and increasing the relative traverse motion between the spray nozzle and the substrate. In this context, it may also be desirable to use spray conditions that allow particles to be embedded but that prohibit coating build-up (i.e. by avoiding exceeding the particle critical velocity).

This process control may be advantageous as it allows the antifouling properties of a polymer surface, or regions of a polymer surface, to be tailored. The desired distribution density of particles in the polymer surface may vary depending upon, amongst other things, the propensity of, for example, marine organisms to otherwise attach to the polymer (the nature of the marine environment will be relevant here) and the extent/longevity of antifouling protection required. An adequate and optimum distribution density can be determined by computer modelling, experiment or trial and error.

The particles may be accelerated in a gas stream at supersonic velocity and directed onto the polymer. Typically, the velocity of the gas stream results in a particle velocity in the range of 300 to 1200 m/s, for example in the range 350 to 1100 m/s, 370 to 1000 m/s or 400 to 900 m/s. The exact velocity required may be dictated by the polymeric substrate that the particles are being embedded in and the extent to which the particles are to be embedded relative to the substrate surface. Routine experimentation and/or the use of computer modeling may be used to readily predict the required velocity of the particles. Further details in this regard are included in Example 1.

The spray process used should be suitably quick to achieve suitably high production throughput. If a given set of spray conditions result in the build-up of material on the initial, embedded layers of particles, such that a continuous coating layer forms on the substrate surface, then this build-up should be avoided by reducing the number of particle impacts on any given area of substrate. This may be achieved, for example, by lowering the powder feed rate and increasing the relative traverse motion between the spray nozzle and the substrate. In this context, it may also be desirable to use spray conditions that allow particles to be embedded but that prohibit coating build-up. In the case of cold spray for instance, it may be possible to employ a particle velocity that achieves embedding of particles but that is less than the critical velocity for particle/particle cohesion as is required for formation of a continuous coating.

Following spray, further processing may be needed to remove loosely bound particles from the surface. This may be done, for example, by wiping or brushing the surface or blasting it with compressed air or by other methods.

Through suitable selection of polymer substrate, particles and process conditions, polymer particles may be embedded in a polymer at high enough solids loadings to enable antifouling functionalisation. Desirably, this may be achieved without damage to the surface being treated. The surface is not subjected to extremely high temperature and high impact erosion may be avoided by controlling the velocity at which the particles are sprayed onto the surface being treated.

Cold-gas dynamic spraying involves supersonic gas velocities. Taking into account the underlying principles of the invention it may also be possible however to embed particles into (soft) polymeric materials by sub-sonic particle acceleration. In this case, simpler, low pressure gas systems such as grit blasting equipment may be utilised.

Desirably, the particles are embedded in the polymer such that at least a portion of the particles are exposed and therefore open to the environment at or just below the surface of the polymer. Such particles will contact the environment in which the polymer is to be used and will be immediately effective in preventing fouling of the polymer surface. However, it may also be desirable for a portion of the particles not to be exposed in this way. Thus, it may be useful for a portion of particles to be embedded at a greater depth in the polymer and not be directly exposed to the environment. It will be understood that due to process variations and the size distribution of the particles, some particles may not be embedded to the desired extent. To enable a more uniform penetration depth of particles into the polymer surface, preferably at least 95 wt % of the particles have a particle size within 80% of the mean particle size, more preferably within 50%, even more preferably within 30% and yet even more preferably within 20% of the mean particle size.

Also, particles that are exposed above the surface of the polymer may be prone to increased chemical release rates during turbulent environmental conditions due to higher gaseous or liquid flow rates over the polymer surface, and decreased rates during static environmental conditions. In the case of preventing marine biofouling, this release profile is the opposite of what is required since the problem is most prevalent in a calm or static environment. In such cases it may be beneficial for at least a portion of particles to be beneath the surface of the polymer that comes into contact with the environment but nevertheless available for contacting with the environment. This would result in a more uniform and prolonged antifouling effect.

Typically, at least a portion of the particles (e.g. at least 5 volume %, at least 10 volume % or at least 20 volume %) are embedded such that at least 40 volume %, at least 60 volume % or at least 90 volume % of each particle is embedded below the surface. This may have the advantage of the particles being securely embedded in the polymer while being less prone to loss from the polymer due to elastic deformation of it. Generally, the greater the volume of particle embedded beneath the surface of the polymer, the less likely it is that the particle will become dislodged subsequently, for example by attrition. The nature of the polymer is also relevant in this regard. Polymers that are more elastic in nature are generally better able to capture particles in accordance with the present invention when compared with more rigid polymer, such as rigid thermosetting polymers. It is also possible that more elastic polymers may provide greater resistance to erosion. This may be beneficial in certain applications although in other applications some (controlled) erosion may actually be desirable since this may lead to exposure of fresh particles that are embedded below the polymer surface. Where selection of the polymer is possible for implementation of the invention, this is another factor that may be considered.

In a preferred embodiment at least a portion (for example at least 10 wt %, such as at least 20 wt % or at least 30 wt %) of the particles are located below the polymeric surface. More preferably, such particles are located below the surface by at least 1 µm more preferably at least 5 µm and even more preferably at least 10 µm. The further the particle is below the surface of the polymeric substrate the greater the expectation of a more prolonged and controlled chemical release from the particle. Also, there is less likelihood of the particle being removed from the surface during use.

Impact of particles on the polymer will create structural changes at the polymer surface due to deformation of the polymer. These structural changes are characteristic of the particle impact elastic (viscoplastic) deformation mechanism which enables the particles to be trapped within the polymer. In general terms, the particles will be embedded in craters or cavities (pockets) that form in the polymer due to particle impact. Craters have raised edges extending above the original surface of the polymer (see FIG. 3) formed by lateral and upward displacement of polymer as the particle impacts its surface. A cavity does not have such raised edges. Particles may be located in craters and/or cavities with a portion of the particles surface extending above the polymer surface. Alternatively or additionally, particles may be located in craters and/or cavities with no portion of the particles surface extending above the polymer surface. If a particle becomes embedded in the polymer such that the portion of the particle with the largest dimension is beneath the polymer surface, the particle may be held in place as a result of the opening of crater or cavity closing due to the inherent elasticity of the polymer. For spherical particles, the largest dimension will be the particle diameter.

It has been observed that treatment of a surface with particles in accordance with the present invention may lead to an increase in the average surface roughness of a polymer surface. This may be due to being embedded in the polymer with some portion of the particles protruding above the polymer surface and/or particle impacts causing the formation of craters on the polymer surface. Such surface features can result in an increase in the average surface roughness. The propensity for such surface features to form at the polymer surface will depend upon the exact combination of materials and conditions used. The average surface roughness ($R_a$) of a surface may be determined using a Mahr Perthometer. Increased surface roughness may lower the coefficient of friction of the surface. Reducing the coefficient of friction of a surface may be preferred in certain applications in which flexible surfaces are required to slide over other surfaces during use. For instance, in marine cables, reduced self-friction improves the ability of the cable surfaces to slip past each other on contact, avoiding potential damage to the cable during spooling.

Thus, in another embodiment the present invention provides a polymer composite comprising particles having antifouling properties embedded in a polymer surface, wherein the particles are embedded in the polymer surface without an adhesive or binder, wherein the particles do not form a continuous layer on the polymer surface, wherein the polymer is a thermoplastic or cured thermoset polymeric, wherein the particles occupy craters or cavities extending into the polymer and created by impact of the particles on the polymer, wherein at least 40 volume % of each particle is below the surface of the polymer. In this embodiment, it is also preferred that the largest dimension of the particle is beneath the polymer surface so that the particle may be held in place as a result of the opening of the crater or cavity closing due to the inherent elasticity of the polymer.

With repeated treatment of a polymer or region thereof, particles already embedded in the polymer are likely to be impacted by further particles. This may result in multiple particles being embedded within a single cavity (or pocket) within the polymer. In this case the particles located most closely to the surface will be exposed to the environment (e.g. air, water, etc) first with those particles embedded more deeply in the polymer being exposed to the environment at a later stage. This arrangement may also lead to prolonged chemical release and thus functionalisation of the polymer.

The present invention is believed to have wide ranging utility. In general terms, the method of the invention may be applied to protect a polymer surface against fouling, preferably biofouling, such as marine biofouling. While the method may be suitably used to protect polymer surfaces from fouling and, in particular marine biofouling, the inventive principle of the present invention may be applied to a variety of applications in which sustained functionality is required. In accordance with the present invention this may be achieved if the active particles are functionally active due to a chemical release mechanism.

The invention is believed to have significant potential to remedying the problems caused by marine biofouling. Examples of specific applications where the invention may be applied include the following:

- Boat hulls and boat components that contact a marine environment.
- Seismic streamers and seismic acquisition equipment, including a seismic streamer cable, where a cable houses acoustic transducers, sensors or electrical conduit, may or may not include a gel or liquid, and has an outer skin layer consisting preferably of a polyurethane-based polymer.
- Auxiliary equipment that forms part of the seismic streamer or streamer array, including, but not limited to, birds and bird wings where these are essentially stabilising devices, weights, couplers used for joining sections of streamer cables together, and flexible sections.
- Aquaculture applications including sea cage netting and netpens; mussel longlines and flotation buoys; oyster cages; scallop cages; aerator blades, aerator floats, boat moorings buoys, ropes and mussel spat collecting ropes.
- Wave power buoys and wave energy capture floats and associated equipment.
- Tidal power equipment.
- Shipping sea chests.
- Fresh water pipelines (to prevent biofilm formation or bryozoan accumulation, for example).
- Sea water inlet pipelines.
- Floating marina pontoons.
- Inlet pipe casing (external or internal).
- Water pipe linings (internal and/or external) to prevent fouling.
- Casing for oil rig, ocean platforms to prevent fouling.

The invention may also be implemented to enhance health or hygiene. For example the invention could be applied to treat the internal surfaces of air conditioning units to prevent the accumulation and growth of potentially harmful microorganisms, such as the bacterium *Legionella* that is responsible for Legionnaires' disease.

It is also envisaged that particles could be embedded into a polymeric substrate which provides a chemical release and which contributes to hydrophobic or stain resistant properties of the surface.

The invention is illustrated with reference to the following non-limiting examples.

EXAMPLE 1

This example serves to illustrate the use of cold spray for embedding copper particles into a flexible polymeric substrate. It also demonstrates the effectiveness of the invention in deterring settlement onto the polymer surface by marine organisms.

Polyurethane seismic streamer skin tubing with outer diameter 64 mm and wall thickness 3.4 mm was sourced from Colex International Ltd (Leicestershire). The elastic (storage) modulus of the streamer skin, measured by dynamic mechanical analysis (DMA) according to the method explained in Example 10 was 28 MPa. The Shore D2 hardness of the streamer skin, measured with a Shore® Durometer was 43. 600 mm-long lengths of tubes were used. Copper metal powder was embedded into the surface of the streamer skins using a CGT Kinetiks 4000 cold spray system (Cold Gas Technology GmbH, Ampfing, Germany). The as-supplied copper powder was −325 mesh, meaning that it had been screened by the manufacturer through a mesh to remove particles of size greater than 45 micrometers. The average particle size, measured using a Malvern Mastersizer S laser particle size analyser was 26.9 μm.

Nitrogen gas was accelerated to Mach number 3.4 through a converging-diverging nozzle with diverging section length 130 mm. Immediately upstream from the nozzle the temperature of the gas was maintained at 400° C. and the pressure of the gas at 2.5 MPa by a computer control system. The copper powder was fed into the nitrogen gas stream so that the particles exited the nozzle at high velocity. Due to cooling of the gas stream during expansion through the nozzle and controlled, fast movement of the nozzle past the substrate bulk melting of the polyurethane substrate was not observed.

For cold spray embedment a range of gas temperatures, gas pressures and gas composition may usually be used with various degrees of effectiveness. The particular choice of parameters is determined by a number of factors, which include the substrate material, powder material, powder particle size, and limitations of the cold spray system.

A 300 mm length (exactly one half) of each streamer skin was cold sprayed using the following method. The skins were fitted onto a metal rod and spun on a lathe. The nozzle was held by a robot arm and aimed perpendicularly to the skins so that the distance between the nozzle exit and the streamer surface remained constant at 30 mm. The nozzle was moved from one end of the skin to the halfway point, so that the surface of the sprayed area was embedded evenly with copper powder.

After cold spray each sample was wiped using lint-free laboratory tissue paper to remove loose particles. The weight of each sample was measured before and after the cold spray+wiping process. From the difference in weight the loading of copper particles per square meter of streamer skin could be calculated.

Practice of the method taught in this invention will show that for a given powder, substrate material, and cold spray parameters, the particle loading in the substrate surface may be controlled by alteration of the relative speed of movement of the nozzle and substrate. In this example the streamer skins were spun at a constant 615 revolutions per minute. Two different nozzle traverse speeds were employed. Some skins were sprayed with the nozzle traversing at 0.033 m/s, which resulted in a measured average particle loading in the sprayed area of 22±5 g/m². For the remaining skins a nozzle traverse speed of 0.0083 m/s was used, and on those skins the average particle loading in the sprayed area was 101±11 g/m².

Figure 4:
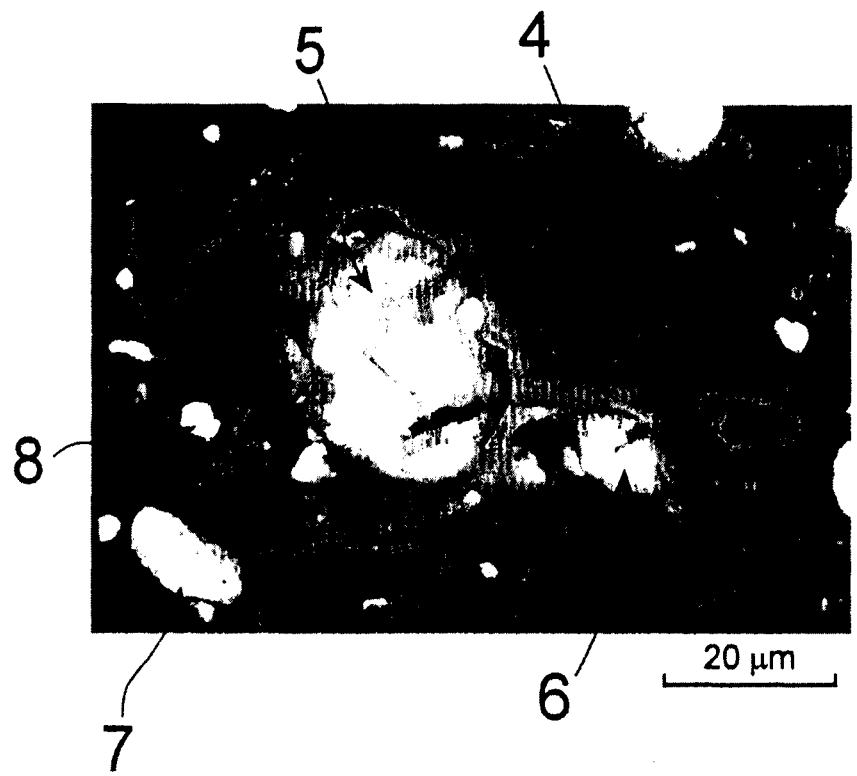
FIG. 4 is a scanning electron micrograph as referred to in Example 1.

FIG. 4 is a scanning electron micrograph of the polyurethane surface following the described cold spray procedure at the slower 0.0083 m/s nozzle traverse. The image was obtained using a Leica 440 electron microscope at an accelerating voltage of 20 kV. A backscattered electron detector was used to raise the contrast between the high atomic mass copper and the low atomic mass polymer. Thus the copper particles appear lighter. It was immediately apparent that areas of bare polymer (4) were exposed between copper particles, and that therefore a fully covering layer of copper was not formed. Some particles (5, 6) had penetrated the surface more deeply compared with other particles (7, 8). Some particles (6) appeared to have impacted at an angle that was not normal to the surface.

The velocity of particles leaving the cold spray nozzle can be estimated by employing mathematical modelling techniques. For this purpose a one-dimensional isentropic model was used, the details of which have been published in [1]. The one-dimensional isentropic approximation is a simple method that is used widely within the scientific literature for predicting cold spray particle velocity.

It was assumed that the entrained particle stream was dilute enough to have no bearing on the gas. It was also assumed that the gas flow was unaffected by any boundary layer effects at the nozzle wall.

According to isentropic theory, the Mach number, M, can be determined at any location in a shock-free, supersonic nozzle from the ratio of nozzle area at that point, A, to the throat area A*, as per the area-Mach relation, Equation 1.

$$\left(\frac{A}{A^*}\right)^2 = \frac{1}{M^2}\left[\frac{2}{\gamma+1}\left(1+\frac{\gamma-1}{2}M^2\right)\right]^{(\gamma+1)/(\gamma-1)} \quad \text{(Equation 1)}$$

where $\gamma$ is the specific heat ratio. Equation 1 was solved numerically for M using the bisection method.

Other local properties of the gas phase—temperature, pressure, density and velocity—are functions of M, $\gamma$ and the gas pressure and gas temperature immediately upstream from the nozzle [2].

The model assumes that all particles are spherical and travel along the centre axis of the nozzle. Acceleration of a spherical particle of diameter $d_p$ and density $\rho_p$ within this flow field could then be calculated according to Equation 2, which is derived from Newton's second law and the expression for drag force on the particle.

$$\frac{dv_p}{dt} = \frac{3C_D\rho_g}{4d_p\rho_p}(v_g - v_p)^2 \quad \text{(Equation 2)}$$

where $\rho_g$ and $v_g$ are the gas density and velocity, respectively, and $C_D$ is the drag coefficient. $C_D$ was calculated according to the correlations derived by Henderson et al. [3].

The velocity of a 26.9 μm (average size) copper particle was calculated. With an upstream temperature of 400° C. and upstream pressure of 2.5 MPa the velocity of the 26.9 μm copper particle leaving the Mach 3.4 nozzle was calculated to be $5.4\times10^2$ m/s. Larger particles are more difficult to accelerate in the jet. The exit velocity of a 45 μm particle was also calculated using the same jet conditions, and the result was $4.7\times10^2$ m/s. This is considerably greater than the velocities developed in low-pressure spray equipment such as grit blasting units, which are typically below 200 m/s.

For evaluation of the antifouling effectiveness of the streamer skins field trials were performed. Streamer skins were slipped over a 40 mm PVC tube leaving at least 50 mm between each. The trials included 5 skins cold sprayed with a copper loading of 22±5 g/m² and 4 skins cold sprayed with a copper loading of 101+11 g/m². They were deployed at the Yacht Club at Townsville, Australia, along the piers approximately 200 mm under the water's surface, 60 mm from the edge of the pier. Digital photographs were taken of the exposed (facing outward) and not exposed (facing inward against the pier) streamer skin surfaces.

Figure 5:
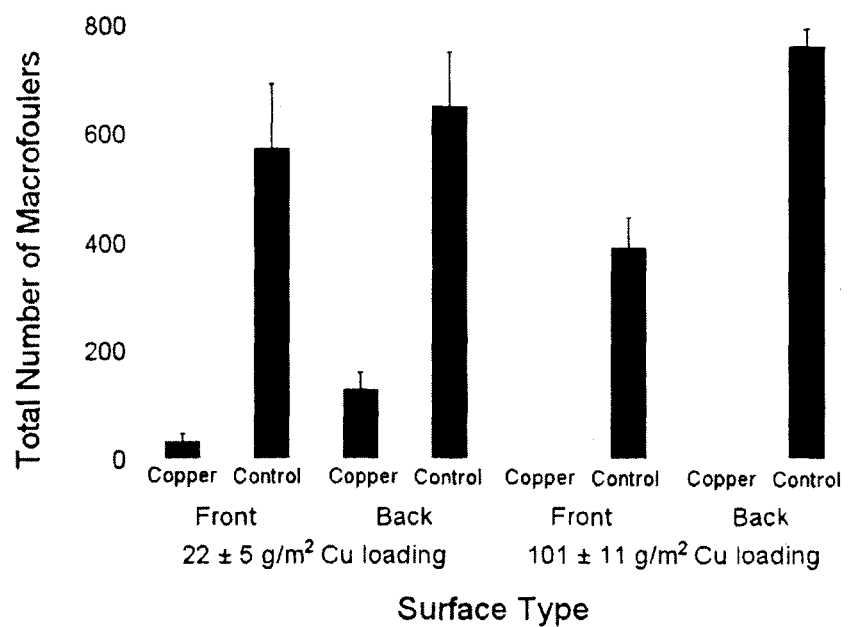
FIG. 5 is a bar chart illustrating results obtained in Example 1.

It was observed that macrofoulers including barnacles, *Amphibalanus reticulatus* and tubeworms settled on some of the surfaces. The total number of macrofoulers on the samples was counted, and the results after 146 days are presented as a bar chart in FIG. 5. It was found that the areas cold sprayed with a copper loading of 22±5 g/m² had significantly fewer macrofoulers than the untreated areas. At a copper loading of 101±11 g/m² no macrofoulers were observed after 146 days. Fouling of the streamer skins embedded at the highest copper loading was limited to the microfouler *Ulva* sp., a copper resistant green algae which was present also on the other surfaces.

1. P. C. King, S. Zahiri, M. Jahedi, and J. Friend, Aluminium coating of lead zirconate titanate—A study of cold spray variables. Surf. Coat. Technol. 205 (2010), Issue 7, pp. 2016-2022
2. R. C. Dykhuizen, and M. F. Smith, Gas Dynamic Principles of Cold Spray. J. Therm. Spray Technol. 7 (1998), Issue 2, pp. 205-212
3. C. B. Henderson, Drag coefficients of spheres in continuum and rarefied flows. AIAA Journal 14 (1976), Issue 6, pp. 707-708

EXAMPLE 2

This example serves to illustrate the use of cold spray for embedding metallic zinc particles into a polymeric substrate and the effect of this process on the settlement of fouling organisms on the surface.

Zinc powder was cold sprayed using the CGT Kinetiks 4000 system described in Example 1. The average particle size of the powder, measured using a Malvern Mastersizer S laser particle size analyser was 33.8 μm. The zinc powder was sprayed onto 110 mm×140 mm, 6 mm-thick panels of high density polyethylene (HDPE). The elastic (storage) modulus of the HDPE panels, measured by dynamic mechanical analysis (DMA) according to the method explained in Example 10 was $1.8\times10^3$ MPa. The Shore D2 hardness of the HDPE, measured with a Shore® Durometer was 59. Three panels in total were cold sprayed. A Mach 4.0 nozzle with diverging section length 71 mm was used. The nitrogen gas temperature at the entry point to the nozzle was 200° C. and the pressure of the gas was 2.5 MPa. Under these conditions the calculated velocity of a 33.8 μm zinc particle leaving the nozzle was $4.0\times10^2$ m/s. The cold spray nozzle was held by the robot arm at a constant standoff distance of 30 mm from the substrate surface, and moved laterally in a raster pattern at a speed of 0.25 m/s, with a spacing between passes of 2 mm. After cold spray each sample was wiped using lint-free laboratory tissue paper to remove loose particles. The weight of each sample was measured before and after the cold spray and wiping process. The weight change of the panels due to the cold spray procedure was measured to be 142+/−5 g/m².

Figure 6:
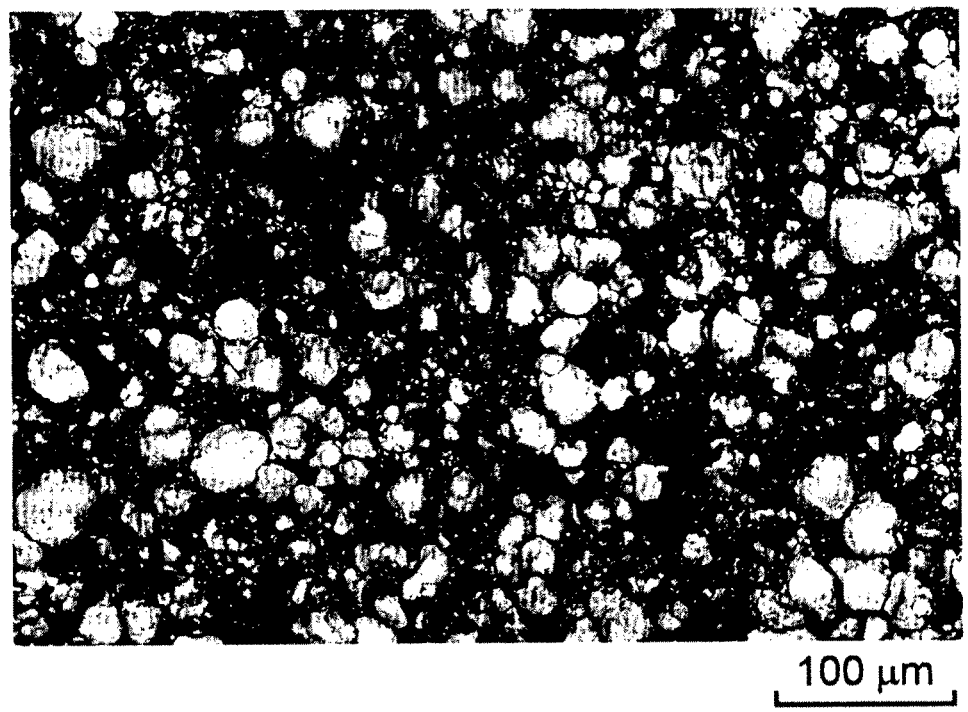
FIG. 6 is a scanning electron micrograph as referred to in Example 2.

The scanning electron micrograph in FIG. 6 shows the zinc-embedded surface in backscattered electron mode. The surface had been considerably roughened by the repeated impact of the zinc particles. As with the copper particles in Example 1, some zinc particles penetrated fully below the surface, while other embedded particles sat mostly above the surface. The polyethylene surface was not fully covered by a coating of zinc particles.

Marine biofouling of the zinc-embedded HDPE plates was compared with that on metallic zinc sheet and unsprayed HDPE in a field trial. Six 110 mm×140 mm plates (three of each material) were held in a parallel row, secured by cable ties within a frame made of PVC pipe, but so as not to come in contact with the frame. The whole assembly was hung from the pier at Townsvile Yacht Club, Australia.

Figure 7:
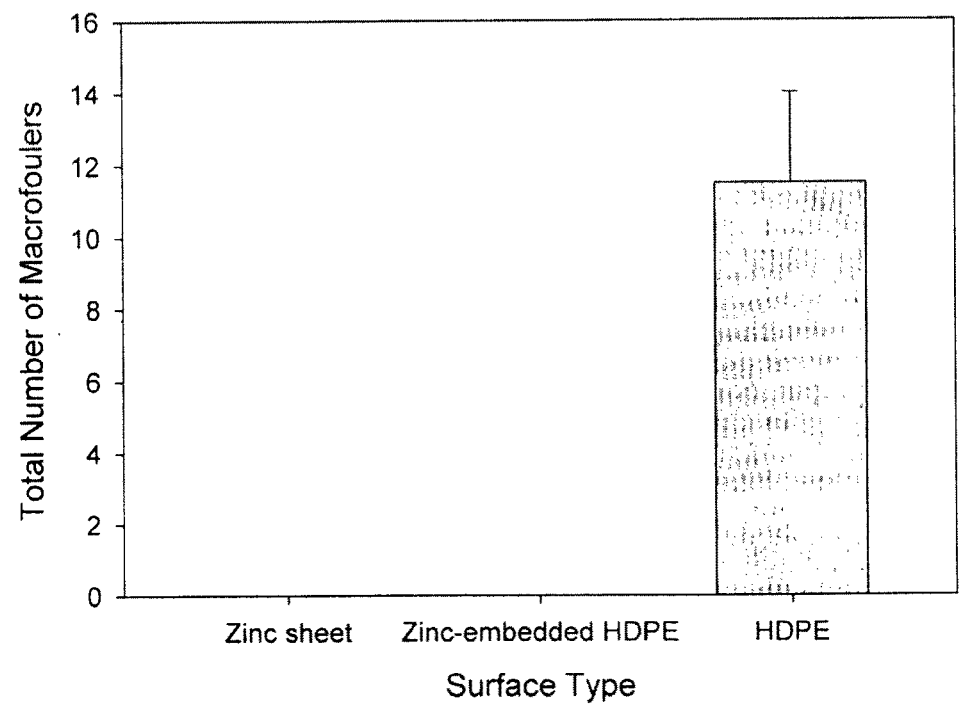
FIG. 7 is a bar chart illustrating results obtained in Example 2.

After 64 days submersion digital photographs of the panels were made, and the total number of macrofoulers on each was counted. The average number of macrofoulers for each type of material is represented in FIG. 7. The unsprayed HDPE was fouled by *Ulva* sp., *Ectocarpus* sp., bryozoans and tubeworms. The last two organisms fall under the category of macrofoulers. In contrast, the HDPE panels cold-sprayed with zinc and the zinc plates were fouled by *Ulva* sp. only, while no macrofoulers were observed.

EXAMPLE 3

This example serves to illustrate the use of cold spray for embedding hard, cuprous oxide particles into a polymeric substrate.

Copper (I) oxide, 97% ($Cu+Cu_2O$ assay) powder was purchased from Alfa Aesar. The average particle size, measured using a Malvern Mastersizer S laser particle size analyser was 12.4 μm. A 6 mm flat, high density polyethylene panel was chosen for the substrate material.

The powder was cold sprayed onto the polyethylene using the CGT Kinetiks 4000 system. The Mach 4.0 nozzle with diverging section length 71 mm was used. The nitrogen gas temperature at the entry point to the nozzle was 350° C. and the pressure of the gas was 2.5 MPa. Under these conditions the calculated velocity of a 12.4 μm $Cu_2O$ particle leaving the nozzle was $5.8 \times 10^2$ m/s. The cold spray nozzle was held perpendicularly to the substrate surface at a standoff distance of 30 mm, and moved laterally in a raster pattern so as to spray the entire surface of the samples evenly. The speed of the nozzle movement was 1 m/s and the spacing between passes 2.8 mm.

Figure 8:
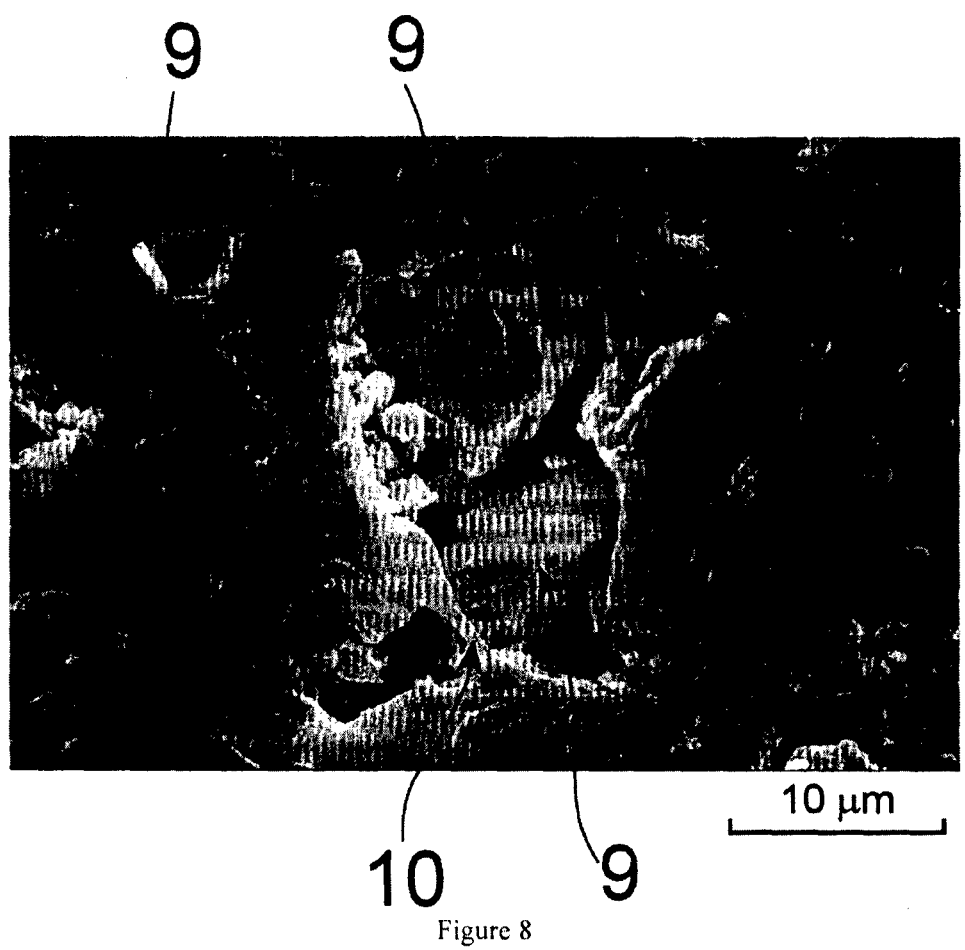
FIG. 8 is a secondary electron micrograph as referred to in Example 3.

The secondary electron micrograph in FIG. 8 shows angular, cuprous oxide particles 9, indicated by black arrows, embedded in the polyethylene surface 10. It may be seen from the polymeric portion 10 which partially covers particle 9, that a mechanism of elastic deformation occurred during the embedment of the particle 9 into the polymeric surface 10. The high velocity impact of the particles caused deformation of the polyethylene and embedment of the particles in a manner similar to that seen with metallic particles in Examples 1 and 2.

EXAMPLE 4

The following example serves to illustrate the use of a portable, hand-held cold spray device for embedding antifouling particles into a polymer surface, in accordance with the general methodology described in this invention. The smaller, hand-held unit has the considerable advantage that it may be brought to any site where cleaning or repair of marine equipment or infrastructure is carried out. Polymer surfaces may be resprayed at intervals to maintain their marine biofouling resistance.

The cold spray system used was a Dymet® model 403 by Licensintorg, Moscow, Russian Federation. The system ran on compressed air at a pressure of 0.6-0.7 MPa. It included a heater capable of raising the air temperature to ~490° C. at the highest setting. This was set to $4/5^{th}$ power during the experiment.

The nozzle assembly contained two parts. The first was a bronze converging-diverging section with total length 20 mm and throat diameter 2.5 mm. The exit profile of the bronze section was rectangular. Onto the exit of the bronze section a 140 mm-long steel nozzle extension was attached. The exit area of the steel section was 10 mm×3 mm.

The powder chosen was the same −325 mesh copper powder used in Example 1. It was fed by plastic tubing from a vibratory hopper into a hole in the narrow end of the steel nozzle section. With air passing through the nozzle and the powder feed line open, powder was sucked into the nozzle by Venturi forces.

Figure 9:
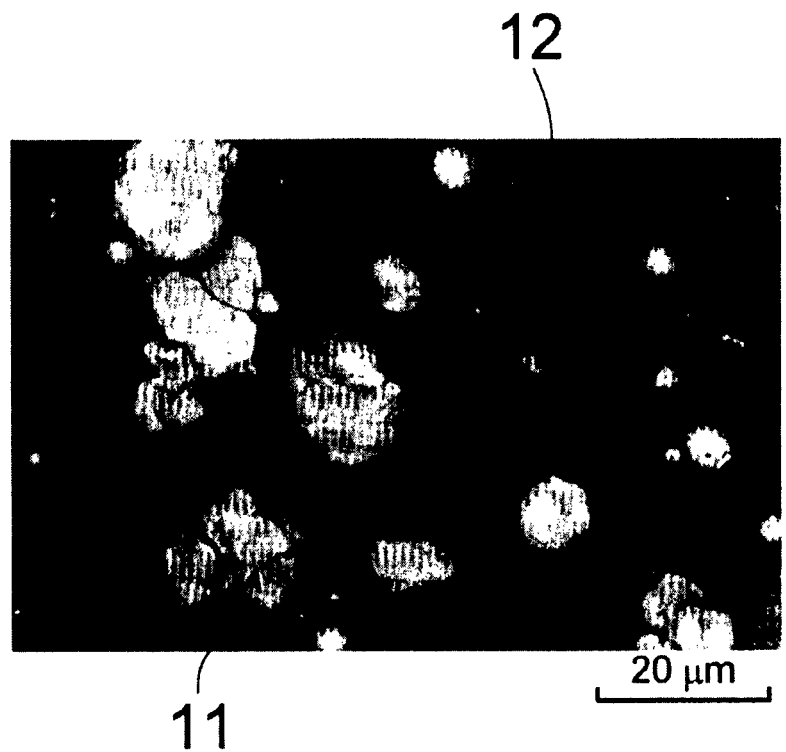
FIG. 9 is a backscattered electron micrograph as referred to in Example 4.

Copper was sprayed onto polyurethane streamer skin from Colex International Ltd (Leicestershire). FIG. 9 is a backscattered electron image of the copper-embedded surface, showing embedded copper particles 11 (lighter contrast) in the polyurethane surface 12 (darker contrast).

EXAMPLE 5

The following example is provided to demonstrate that the spray regime under which particles may be embedded into polymeric materials is not necessarily the same as that which is necessary for build up of material in the form of a coating. The term "spray regime" is used here to mean the combined set of experimental parameters including particle material and size distribution, substrate material and variables controlling the accelerating gas jet (upstream temperature, pressure and nozzle design).

Flat, high density polyethylene and polytetrafluoroethylene (PTFE) samples were cold sprayed with copper using a CGT Kinetiks 3000 cold spray system (Cold Gas Technology GmbH, Ampfing, Germany), which is similar to the CGT Kinetiks 4000 system described above but restricted to gas pressures no greater than 3.0 MPa and gas temperatures no greater than 600° C. CGT Kinetiks 3000 cold spray system (Cold Gas Technology GmbH, Ampfing, Germany). The as-supplied copper powder was −325 mesh, meaning that it had been screened by the manufacturer through a mesh to remove particles of size greater than 45 micrometers. The average particle size, measured using a Malvern Mastersizer S laser particle size analyser was 26.9 μm. Nitrogen gas was accelerated to Mach number 3.4 through a converging-diverging nozzle with diverging section length 130 mm. One face of each sample was sprayed evenly by moving the nozzle in a raster pattern at 0.5 m/s with a 2 mm spacing between passes. A range of nozzle traverse speeds was investigated, from 0.1 m/s to 1.0 m/s. The temperature of the nitrogen gas upstream from the nozzle was maintained at 250° C. and the pressure maintained at 2.5 MPa. Under thee conditions the nozzle exit velocity of a 26.9 μm (average size) copper particle was calculated to be $5.0 \times 10^2$ m/s. After cold spray each sample was wiped using lint-free laboratory tissue paper to remove loose particles. The weight of each sample was measured before and after the cold spray and wiping process.

Figure 10:
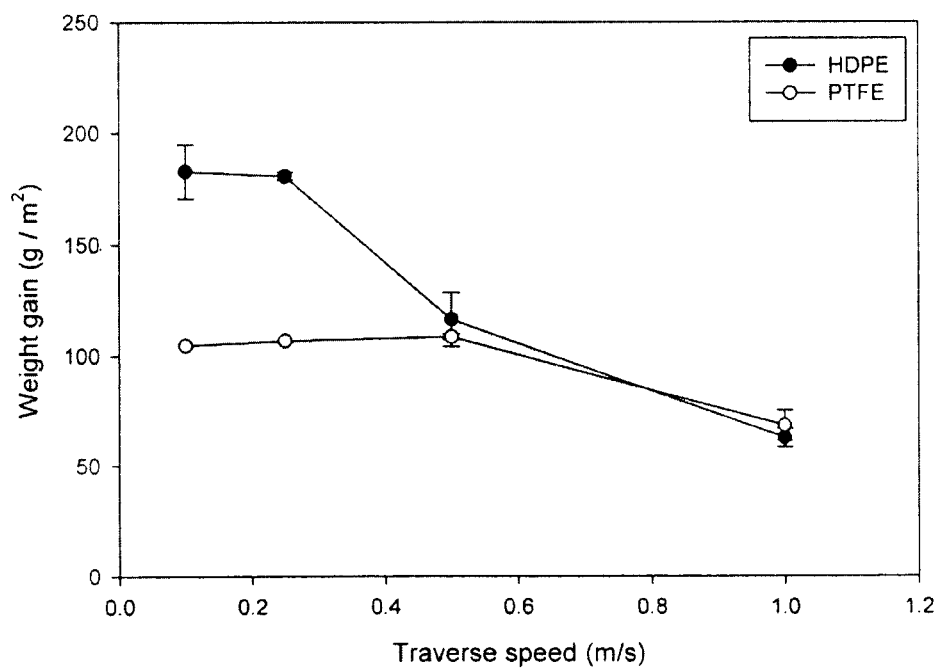
FIG. 10 is a graph illustrating results obtained in Example 5.

The results in FIG. 10 show net weight gain after wiping. They indicate that with decreasing traverse speed the weight gain of the samples increased up to a maximum level, below which the weight gain either levelled out or began to decrease again. The increase in weight gain with decreasing speed was due to a higher loading of copper particles as a result of the surface being exposed longer to the particle spray stream. However, when the nozzle traverse was slowed down further the build up of a fully continuous coating layer did not ensue. Instead, erosion of the polymer surface (i.e. removal of material) became a competing factor which limited any further weight gain. This proved that under the current spray regime build-up of a thick copper deposit could not possibly eventuate, distinguishing the embedding spray method from conventional use of cold spray.

EXAMPLE 6

The following example demonstrates that effectiveness of the particle embedment method and ability to load surfaces with antifouling particles in quantities sufficient to deter settlement of marine organisms may be dependent on the type of polymer surface to be sprayed.

Six different types of polymer were cold sprayed; nylon 6, high density polyethylene (HDPE), polytetrafluoroethylene (PTFE), polypropylene (PP) and polycarbonate (PC) and polyurethane streamer skin (PU). Nylon 6, HDPE, PTFE, PP and PC were in flat sheet form, while sections cut from the tubular PU streamer skin were held flat during cold spraying.

The samples were cold sprayed with −325 mesh copper powder using a CGT Kinetiks 3000 cold spray system (Cold Gas Technology GmbH, Ampfing, Germany), which is similar to the CGT Kinetiks 4000 system described above but restricted to gas pressures no greater than 3.0 MPa and gas temperatures no greater than 600° C.

Nitrogen gas was accelerated to Mach number 3.4 through a converging-diverging nozzle with diverging section length 130 mm. One face of each sample was sprayed evenly by moving the nozzle in a raster pattern at 0.5 m/s with a 2 mm spacing between passes. The temperature of the nitrogen gas upstream from the nozzle was maintained at 250° C. and the pressure maintained at 2.5 MPa. Under these conditions the velocity of a 26.9 µm (average size) copper particle exiting the nozzle was calculated using the model described in example 1 to be $5.0 \times 10^2$ m/s. After cold spray each sample was wiped using lint-free laboratory tissue paper to remove loose particles. The weight of each sample was measured before and after the cold spray+wiping process.

Figure 11:
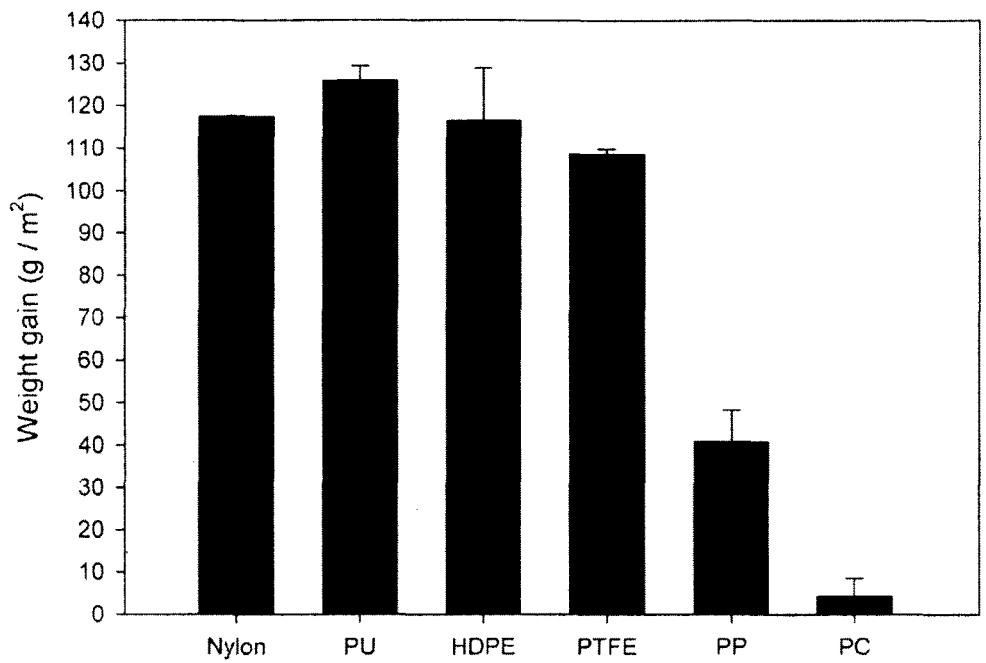
FIG. 11 is a graph illustrating results obtained in Example 6.

The average weight change of each type of polymer is represented in bar chart form in FIG. 11. Under these spray conditions a large increase weight was observed on four materials; nylon, polyurethane, high density polyethylene and polytetrafluoroethylene. The weight increase of more than 100 g/m² corresponded to a copper loading which has been demonstrated in the polyurethane streamer skin field trials to be an effective deterrent level for ocean biofouling (Example 1). The surface of these samples was also observed to have a metallic red-orange colour, similar to that of the unsprayed copper powder.

On the other hand, the polycarbonate exhibited a weight increase of less than 10 g/m². The surface of the polycarbonate samples was more opaque and had a roughened, grit-blasted appearance: however to the unaided eye the characteristic metallic copper colour was not evident.

The polypropylene surface was intermediate between these two extremes. The surface colour changed to metallic copper, but the weight change, while greater than that of the polycarbonate was nonetheless, considerably less than for the four other polymers.

The room temperature Shore D-2 hardness of the unsprayed polymers was measured using a Shore® Durometer. The elastic (storage) modulus of the materials was also determined using by dynamic mechanical analysis (DMA) according to the method explained in Example 10. The results of these two tests are given in the table below. It was found that there was some correlation between hardness and stiffness at room temperature and weight gain by embedment during cold spray. At room temperature polycarbonate is harder than the other polymers used as examples here. Polypropylene also presents high hardness, although only marginally higher than nylon. As a loose generalisation, harder polymers are found to be more resistant to embedment by cold sprayed particles. But, for a fuller understanding of the requisite material properties, it is necessary to consider the high-strain rate deformation processes that occur as a particle travelling at high velocity penetrates the surface, with resultant release of heat. For instance, nylon is generally known to soften with only mild heating as it passes through its glass transition point, in the temperature range 40-60° C. This may have had an important influence on the relative ease of embedment that may not have been immediately suspected by examination of the low strain-rate, room temperature data in the table below.

| Polymer name | Abbreviation | Elastic (storage) modulus (MPa) | Shore D2 hardness |
|---|---|---|---|
| Nylon 6 | Nylon | 1097 | 70 |
| Streamer skin (polyurethane) | PU | 28 | 43 |
| High density polyethylene | HDPE | 1813 | 59 |
| Polytetrafluoroethylene (Teflon) | PTFE | 1050 | 61 |
| Polypropylene | PP | 1757 | 72 |
| Polycarbonate | PC | 2048 | 77 |

EXAMPLE 7

The following example demonstrates that copper particles, when sprayed onto a polymeric substrate in accordance with the invention, do not form a continuous layer on the surface. This is done by investigation of the electrical properties of the sprayed surface.

Figure 12:
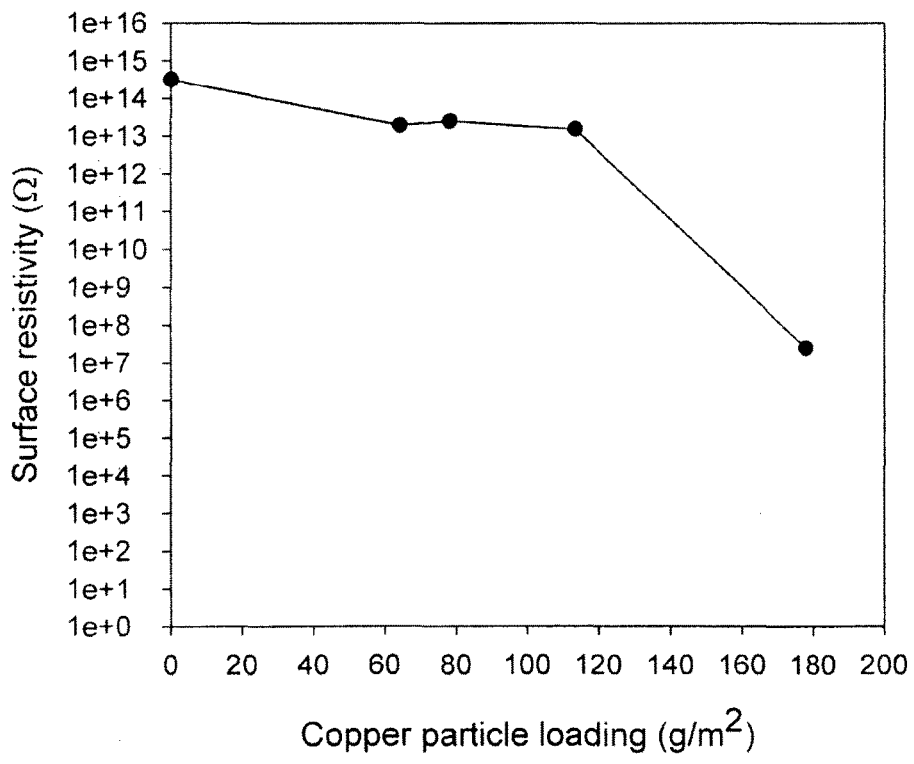
FIG. 12 is a graph illustrating results obtained in Example 7.

The surface resistivity of different sections of polyurethane streamer skin with various copper particle loadings was measured using a Keithley 8009 Resistivity Test Fixture in accordance with ASTM D-257. The results are shown in FIG. 12.

Various measurements of the bulk electric resistivity of conventional cold sprayed coating layers of copper without any annealing treatment have yielded values 26%-124% higher than that for the International Annealed Copper Standard for oxygen free bulk copper [4, 5]. Thus the resistivity of cold sprayed copper in continuous form, although higher than bulk copper, is not orders of magnitude higher. Neighbouring particles in a continuous cold sprayed copper deposit are generally in intimate contact and able to transfer electrical charge. The small difference is due to the high concentration of dislocations and other defects in the cold sprayed material.

Conductive materials have surface resistivities less than $10^5$ Ω/sq. All of the copper-embedded surfaces has resistivities at least two orders of magnitude higher than this value.

4. W. Y. Li, C. J. Li, and H. Liao, Effect of annealing treatment on the microstructure and properties of cold-sprayed Cu coating. J. Therm. Spray Technol. 15 (2006), Issue 2, pp. 206-211
5. R. C. McCune, W. T. Donlon, O. O. Popoola, and E. L. Cartwright, Characterization of copper layers produced by cold gas-dynamic spraying. J. Therm. Spray Technol. 9 (2000), Issue 1, pp. 73-82

EXAMPLE 8

The following example demonstrates embedment of particles onto a polymeric substrate in the form of a net, such as might be used in the aquaculture industry.

Aquagrid® Net, a semi-rigid mesh was sourced from TenCate Industrial Fabrics (whose headquarters are located in Linz, Austria). Aquagrid consists of a ~29 mm×29 mm square grid, made of PVC coated woven polyester fibres. It is used to form enclosures for the farming of fish.

Figure 13:
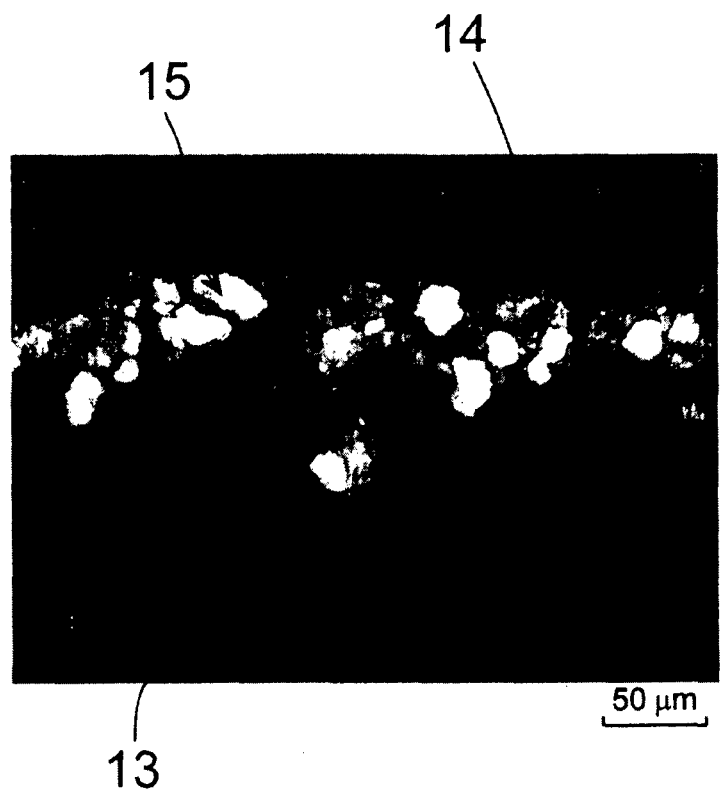
FIG. 13 is an optical micrograph as referred to in Example 8.

The aquagrid net was cold sprayed with −325 mesh copper powder using a CGT Kinetiks 4000 cold spray system. Nitrogen gas was accelerated to Mach number 3.4 through a converging-diverging nozzle with diverging section length 130 mm. A spray temperature of 200° C. and spray pressure of 2.5 MPa were used. Under these conditions the calculated velocity of a 26.9 μm (average size) copper particle leaving the nozzle was $4.9 \times 10^2$ m/s Following cold spray a piece of the net was cross-sectioned and mounted in epoxy. The cross-section was then polished using diamond solution on a felt pad. An optical micrograph of the cross-section is shown in FIG. 13. The surface of the PVC net runs approximately horizontally, the PVC 13 occupying the bottom part of the image and the epoxy mount 14 occupying the top. Copper particles 15 had a lighter contrast and some of these could be seen to have embedded deeply (several particle diameters) below the surface. The copper particles 16 did not form a continuous layer at the surface.

EXAMPLE 9

The following example demonstrates a further advantage of the present invention over coating or cladding methods, in that the entire surface of a component may be sprayed uniformly without obstructing surface features which are important to the operation of the device. No modification of the method is required in order to achieve this.

A Raubioxon Plus aerator pipe was sourced from Rehau (Rehau, Germany). The aerator pipe consists of a rigid polypropylene pipe, covered in a silicone membrane. In operation, the pipe allows air, pumped internally, to exit through slits in the silicone membrane, which open upon sufficient air pressure acting internally. Thus, the device may for example be used under water for the aeration of tanks or other water bodies. However, biofouling of the silicone membrane inhibits effective operation of the aerator.

The silicone membrane was cold sprayed with −325 mesh copper using a CGT Kinetiks 3000 cold spray system (Cold Gas Technology GmbH, Ampfing, Germany). The pipe was mounted on a lathe and spun at 592 rpm. Nitrogen gas was accelerated to Mach number 3.4 through a converging-diverging nozzle with diverging section length 130 mm. A spray temperature of 400° C. and spray pressure of 2.5 MPa were used. Under these conditions the calculated velocity of a 26.9 μm (average size) copper particle leaving the nozzle was $5.4 \times 10^2$ m/s The nozzle was held by a robot arm at a constant distance of 30 mm from the surface of the membrane, and moved laterally at a speed of 0.017 m/s so the whole of the membrane surface was sprayed with copper particles.

Figure 14:
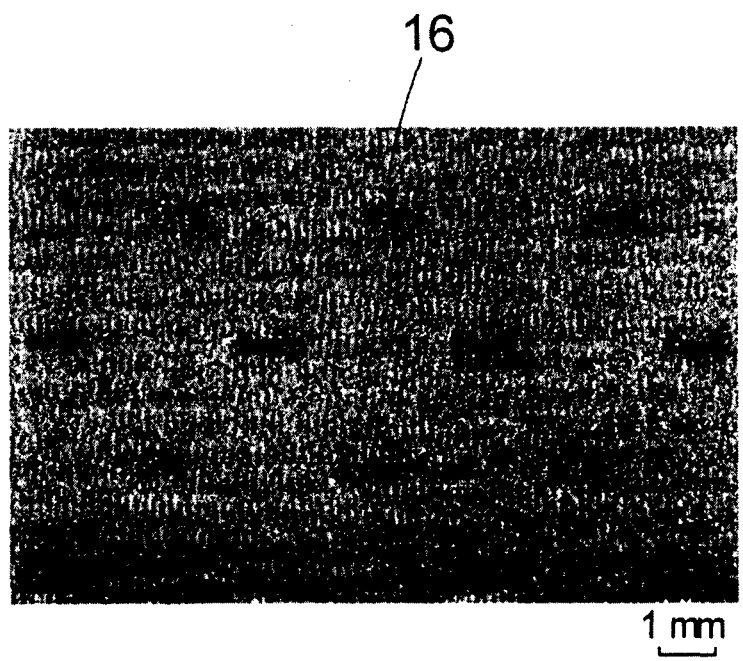
FIG. 14 is a digital photograph as referred to in Example 9.

A weight gain of 60.9 g/m² was measured following cold spray. FIG. 14 is a digital photograph of the copper-embedded membrane surface. Slits 16 are seen here running horizontally. The cold spray embedment method allows the concentration of antifouling particles in the surface to be tailored so as to avoid blocking the slits in the membrane which are essential for operation of the device, while maintaining a minimum level for antifouling efficacy.

EXAMPLE 10

This example serves to illustrate the effect of embedding antifouling particles on the modulus and hardness of coated polymer to demonstrate the extent of the changes that could be anticipated.

PTFE, HDPE, nylon and polypropylene polymers were supplied as flat sheet. Copper powder was embedded into the surface of the sheets using a CGT Kinetiks 3000 cold spray system (Cold Gas Technology GmbH, Ampfing, Germany). The nozzle was held by a robot arm and moved in a raster pattern with a 2 mm spacing between passes so that the surfaces were uniformly sprayed. Polyurethane was supplied as tubing and samples were fitted onto a metal rod and spun on a lathe at 192 rpm for coating. Copper metal powder was embedded into the surface of the streamer skins using a CGT Kinetiks 4000 cold spray system (Cold Gas Technology GmbH, Ampfing, Germany). All polymers were nominally 2 or 3 mm thick.

Nitrogen gas was accelerated to Mach number 3.4 through a converging-diverging nozzle with diverging section length 130 mm. Immediately upstream from the nozzle the temperature of the gas was maintained at 250° C. and the pressure of the gas at 2.5 MPa by a computer control system. The as-supplied copper powder was −325 mesh, meaning that it had been screened by the manufacturer through a mesh to remove particles of size greater than 45 micrometers. The average particle size of the powder, measured using a Malvern Mastersizer S laser particle size analyser was 34.6 μm. Samples with different particle loadings were produced by varying the traverse speed of the nozzle over the samples.

After cold spray each sample was wiped using lint-free laboratory tissue paper to remove loose particles. The weight of each sample was measured before and after the cold spray and wiping process. From the difference in weight the loading of copper particles per square meter of streamer skin could be calculated.

Samples of 13×60 mm were cut from each polymer and machined to have smooth edges. The exact dimensions of each sample were measured five times using digital callipers (Mitutoyo Corporation Model CD-12" Series 500) and an average value used in modulus calculations.

Young's modulus was measured using an Instron Tensile 5567 with 30 kN load cell at room temperature using a crosshead speed of 5 mm/minute and gauge length of 30 mm, based on the method ASTM D 3822-07. Storage modulus was measured using Dynamic Mechanical Analysis using a TA Instruments DMA Q800 with the following operating conditions: DMA Multifrequency Strain mode, dual cantilever clamp, 20 μm amplitude and 1 Hz frequency. Sample dimensions were measured using Fowler Pro Max electronic digital callipers. Hardness was measured using a Shore D2 Hardness Meter fitted to a press stand to allow the instrument to be used normal to the polymer surface and without twisting. The instrument was pressed into the polymer surface that had been cold sprayed with copper particles.

The results are given in the table below and show that while the Young's modulus can increase or decrease somewhat depending on the polymer and the level of particle embedment, it stays substantially within the bounds of the untreated polymer. Similarly the Storage modulus may increase or decrease somewhat depending on the polymer type and level of particle embedment. Further, the amount of variation in modulus depends somewhat on the measurement employed (Young's or storage modulus), but in both cases it stays substantially within the bounds of the untreated polymer. The Control samples are samples of the same polymer before any treatment.

Hardness measurements show the polymer hardness either remains the same or only changes slightly after cold spraying with antifouling particles.

Table Showing Young's Modulus of Polymers Embedded with Particles.

| Polymer and Treatment | Young's Modulus (MPa) | Percent Change (%) |
|---|---|---|
| PTFE, Control | 306 | |
| PTFE with 64.7 g/m² copper | 314 | 2.6 |
| PTFE with 143.2 g/m² copper | 345 | 12.7 |
| HDPE, Control | 703 | |
| HDPE with 85.9 g/m² copper | 468 | −33.4 |
| HDPE with 238.5 g/m² copper | 410 | −41.7 |
| Nylon, Control | 652 | |
| Nylon with 71.5 g/m² copper | 581 | −10.9 |
| Nylon with 192.6 g/m² copper | 557 | −14.6 |

Table Showing Storage Modulus and Shore D-2 Hardness of Polymers Embedded with Particles.

| Polymer and Treatment | Storage Modulus (MPa) | Percent Change (%) | Shore D-2 hardness | Percent Change (%) |
|---|---|---|---|---|
| PTFE, control | 1050 | | 61 | |
| PTFE with 104.7 g/m² copper | 1326 | 26.3 | 57 | −6.6 |
| PTFE with 106.8 g/m² copper | 1403 | 33.6 | 60 | −1.6 |
| PTFE with 68.3 g/m² copper | 1454 | 38.5 | | |
| HDPE, control | 1813 | | 59 | |
| HDPE with 85.9 g/m² copper | 1464 | −19.2 | 62 | 5.1 |
| HDPE with 238.5 g/m² copper | 1445 | −20.3 | 62 | 5.1 |
| Nylon, control | 1097 | | 70 | |
| Nylon with 71.5 g/m² copper | 990 | −9.8 | 70 | 0 |
| Nylon with 192.6 g/m² copper | 1143 | 4.2 | 71 | 1.4 |
| Polypropylene, control | 1757 | | 72 | |
| Polypropylene with 200.1 g/m² copper | 1600 | −9.0 | 72 | 0 |
| Polypropylene with 78.6 g/m² copper | 1668 | −5.1 | 71 | −1.4 |
| Polypropylene with 22.0 g/m² copper | 1749 | −0.5 | | |
| Polyurethane, control | 28 | | | |
| Polyurethane with 78.2 g/m² copper | 26 | −5.2 | | |
| Polyurethane with 64.3 g/m² copper | 27 | −2.0 | | |

EXAMPLE 11

This example demonstrates the effect of particle embedment into polymer surfaces on the roughness of the surface. Increased surface roughness may be an advantage in application areas where reduced sliding friction is desirable.

The average roughness, $R_a$, of polymer surfaces was calculated from stylus measurements of the surface profiles using a Mahr Perthometer. The measurements were made on the sample set used in Example 6, both before and after the cold spray procedure described in Example 6.

The roughness data are presented in the following table. Before cold spray, the surfaces were all relatively smooth. $R_a < 0.4$ μm. Due to repeated particle impact the roughness increased. However, this roughening effect was considerably lower on the polycarbonate where copper embedment was minimal. On the other polymers $R_a$ rose more dramatically, with those polymers accepting a greater loading of copper particles generally also showing a larger increase in $R_a$.

| Polymer | $R_a$ before cold spray | $R_a$ after cold spray |
|---|---|---|
| Nylon | 0.07 ± 0.03 μm | 3.5 ± 0.3 μm |
| Polyurethane | 0.39 ± 0.07 μm | 4.4 ± 0.2 μm |
| High density polyethylene | 0.24 ± 0.01 μm | 2.9 ± 0.1 μm |
| Polytetrafluoroethylene | 0.37 ± 0.05 μm | 3.3 ± 0.1 μm |
| Polypropylene | 0.09 ± 0.01 μm | 1.7 ± 0.1 μm |
| Polycarbonate | 0.07 ± 0.003 μm | 0.4 ± 0.0 μm |

An increase in surface roughness may be attributable to particles protruding above the surface of the polymer and/or structural features formed in the polymer surface as a result of particle impact, such as craters in the polymer.

The claims defining the invention are as follows:

1. A polymer composite having antifouling properties, wherein the polymer composite comprises:
   at least a top surface layer formed of a polymeric material having an elastic modulus of no more than 3000 MPa, the polymeric material defining a top surface plane of the polymer composite, and
   particles having antifouling properties embedded in the top surface layer formed of the polymeric material, wherein
   the embedded particles are present as individual entities and/or clusters of individual particles and do not form a continuous layer on the top surface layer of the polymer composite, and wherein
   at least some of the particles are embedded completely below the top surface plane of the polymer composite, wherein
   any individual entity of particle embedded completely below the top surface plane of the polymer composite or any cluster of individual particles embedded completely below the top surface plane of the polymer composite is in a respective pocket establishing an open-ended channel in the polymeric material to the top surface plane of the polymer composite, wherein the respective pocket is a crater or a cavity, and wherein
   at least one pocket has a respective open-ended channel having a first cross-section width less than that of a diameter of a particle located within the at least one pocket, the first cross-section width measured in a direction parallel to the top surface plane of the polymer composite, wherein the at least one pocket is in direct open fluid communication with the top surface plane of the polymeric composite via the respective open-ended channel.

2. The polymer composite according to claim 1, wherein the polymer composite has an elastic modulus of no more than 2000 MPa.

3. A polymer composite having a functionalised surface property, the polymer composite comprising:
at least a top surface layer comprising a polymeric material having an elastic modulus of no more than 3000 MPa, the polymeric material defining a top surface plane of the polymer composite; and
particles having a functional property embedded in the polymeric material of the top surface layer, wherein the embedded particles are present as individual entities and/or clusters of individual particles and do not form a continuous layer on the top surface layer of the polymer composite, and wherein
at least some of the particles are embedded completely below the top surface plane of the polymer composite such that portions of the polymeric material at least partly surround the particles embedded completely below the top surface plane of the polymer composite, wherein
any individual entity of particle embedded completely below the top surface plane of the polymer composite or any cluster of individual particles embedded completely below the top surface plane of the polymer composite is in a respective pocket establishing an open-ended channel to the top surface plane of the polymer composite, the open-ended channel providing direct open fluid communication between the top surface plane of the polymer composite and the respective pocket, wherein the respective pocket is a crater or a cavity, and wherein
at least one pocket has a respective open-ended channel having a first cross-section width less than that of a diameter of a particle located within the at least one pocket, the first cross-section width measured in a direction parallel to the top surface plane of the polymer composite.

4. The polymer composite according to claim 3, wherein the polymer composite has an elastic modulus of no more than 2000 MPa.

5. The polymer composite according to claim 3, wherein the embedded particles provide antifouling properties by a chemical release mechanism.

6. The polymer composite according to claim 3, wherein the polymer is a thermoplastic or cured thermoset polymer.

7. The polymer composite according to claim 3, wherein the embedded particles have an average particle size of up to 200 μm.

8. The polymer composite according to claim 3, wherein the embedded particles provide anti-biofouling properties to the polymer surface.

9. The polymer composite according to claim 3, wherein the embedded particles are anti-biofouling particles selected from the group consisting of copper, zinc and/or compounds and alloys composed therefrom.

10. The polymer composite according to claim 3, which further comprises a substrate located beneath the top surface layer formed of the polymeric material.

11. The polymer composite according to claim 3, wherein the embedded particles have a particle density which is at least 5 g/m$^2$ and no more than 300 g/m$^2$.

12. The polymer composite according to claim 5, wherein the polymeric material is a thermoplastic or cured thermoset polymer.

13. The polymer composite according to claim 6, wherein the embedded particles have an average particle size of up to 100 μm.

14. The polymer composite according to claim 12, wherein the embedded particles are anti-biofouling particles selected from the group consisting of copper, zinc and/or compounds and alloys composed therefrom.

15. The polymer composite according to claim 13, wherein the particles are anti-biofouling particles selected from the group consisting of copper, zinc and/or compounds and alloys composed therefrom.

16. A polymer composite having a functionalized surface property, the polymer composite comprising:
a substrate having at least a top surface layer formed of a polymeric material having an elastic modulus of no more than 1500 MPa, the polymeric material defining a top surface plane of the polymer composite, and
particles having a functional property embedded in the top surface layer of the polymeric material by a spray mechanism in which the particles are accelerated and sprayed onto the top surface layer with a suitable velocity such that at least some of the particles are embedded completely below the top surface plane of the polymer composite, wherein
the embedded particles are present as separate entities and do not form a continuous layer on the top surface layer of the substrate, and wherein
any individual entity of the particles embedded completely below the top surface plane of the polymer composite is in a respective pocket in the polymeric material, the respective pocket formed by impact of the particle on the top surface layer of polymeric material, wherein the respective pocket is a crater or a cavity, and wherein
the respective pocket includes an open-ended channel providing direct open fluid communication between a particle embedded in the respective pocket and the top surface plane of the polymeric material, wherein the open-ended channel has a first cross-section width less than that of a diameter of a particle located within the respective pocket, the first cross-section width measured in a direction parallel to the top surface plane of the polymer composite, and wherein
any of the particles embedded completely below the top surface plane of the polymer composite in one of the respective pockets is unconnected directly through the polymeric material forming the top surface layer of the polymer composite by the open-ended channels to adjacent particles embedded completely below the top surface plane of the polymer composite in other respective pockets to thereby not be in fluid communication with the adjacent particles directly through the polymeric material.

17. The polymer composite as in claim 16, wherein the open-ended channels have a dimension which is less than a diameter of the embedded particles.

18. The polymer composite as in claim 16, wherein the functional property of the particles is an anti-biofouling property.

* * * * *